(12) United States Patent
Wu et al.

(10) Patent No.: US 10,001,773 B2
(45) Date of Patent: Jun. 19, 2018

(54) OPTIMAL ONE-WAFER SCHEDULING OF SINGLE-ARM MULTI-CLUSTER TOOLS WITH TREE-LIKE TOPOLOGY

(71) Applicant: Macau University of Science and Technology, Macau (MO)

(72) Inventors: Naiqi Wu, Macau (MO); Qinghua Zhu, Macau (MO); Yan Qiao, Macau (MO); Mengchu Zhou, Macau (MO)

(73) Assignee: Macau University of Science and Technology, Macau (MO)

( * ) Notice: Subject to any disclaimer, the term of this patent is extended or adjusted under 35 U.S.C. 154(b) by 301 days.

(21) Appl. No.: 14/918,577

(22) Filed: Oct. 21, 2015

(65) Prior Publication Data
US 2017/0083008 A1  Mar. 23, 2017

Related U.S. Application Data (60) Provisional application No. 62/221,035, filed on Sep. 20, 2015.

(51) Int. Cl.
G05B 19/41 (2006.01)
G05B 19/418 (2006.01)

(52) U.S. Cl.
CPC ............ *G05B 19/4187* (2013.01); *G05B 2219/45031* (2013.01); *G05B 2219/50291* (2013.01); *Y02P 90/205* (2015.11); *Y02P 90/26* (2015.11)

(58) Field of Classification Search
CPC ...... G05B 19/4187; G05B 2219/45031; G05B 2219/50291; Y02P 90/02
See application file for complete search history.

(56) References Cited

U.S. PATENT DOCUMENTS 5,928,389 A * 7/1999 Jevtic ............... G05B 19/41865
29/25.01
6,224,638 B1   5/2001 Jevtic
(Continued)

FOREIGN PATENT DOCUMENTS

EP    1132792 A2    9/2001

OTHER PUBLICATIONS

Aized, T., "Petri Net as a Manufacturing System Scheduling Tool", Advances in Petri Net Theory and Applications, 2010, ISBN: 978-953-307-108-4, available on the Internet at: "http://www.intechopen.com/books/advances-in-peti-net-theory-and-applications/petri-net-as-a-manufacturing-system-scheduling-tool".*
(Continued)

*Primary Examiner* — Mohammad Ali
*Assistant Examiner* — Kelvin Booker
(74) *Attorney, Agent, or Firm* — Spruson & Ferguson (Hong Kong) Limited (57) ABSTRACT

The scheduling problem of a multi-cluster tool with a tree topology whose bottleneck tool is process-bound is investigated. A method for scheduling the multi-cluster tool to thereby generate an optimal one-wafer cyclic schedule for this multi-cluster tool is provided. A Petri net (PN) model is developed for the multi-cluster tool by explicitly modeling robot waiting times such that a schedule is determined by setting the robot waiting times. Based on the PN model, sufficient and necessary conditions under which a one-wafer cyclic schedule exists are derived and it is shown that an optimal one-wafer cyclic schedule can be always found. Then, efficient algorithms are given to find the optimal cycle time and its optimal schedule. Examples are used to demonstrate the scheduling method.

4 Claims, 4 Drawing Sheets

(56) References Cited

U.S. PATENT DOCUMENTS

| | | | |
|---|---|---|---|
| 6,418,350 B1* | 7/2002 | Hamidzadeh | G05B 19/41865 700/100 |
| 9,146,551 B2* | 9/2015 | Brak | G05B 19/02 |
| 9,223,307 B1* | 12/2015 | Wu | B25J 9/009 |
| 9,227,318 B1* | 1/2016 | Bai | B25J 9/009 |
| 9,333,645 B1* | 5/2016 | Wu | B25J 9/0087 |
| 2005/0102723 A1* | 5/2005 | Van Den Nieuwelaar | G03F 7/70525 718/1 |
| 2007/0090953 A1* | 4/2007 | Park | G05B 19/4183 340/572.1 |
| 2007/0282480 A1* | 12/2007 | Pannese | G05B 15/02 700/213 |
| 2008/0163096 A1* | 7/2008 | Pannese | G05B 19/4069 715/772 |
| 2014/0148924 A1* | 5/2014 | Brak | G05B 19/02 700/12 |
| 2017/0080563 A1* | 3/2017 | Wu | G05B 19/41865 |
| 2017/0115651 A1* | 4/2017 | Wu | G05B 19/0426 |

OTHER PUBLICATIONS

Jung, C.; Kim, H.-J. and Lee, T.-E., "A Branch and Bound Algorithm for Cyclic Scheduling of Timed Petri Nets", Nov. 7, 2013, IEEE.*

Kim, H.J.; Lee, J.-H. and Lee, T.E., "Noncyclic Scheduling of Cluster Tools with a Branch and Bound Algorithm", Dec. 23, 2013, IEEE.*

Lee, Y.-H.; Chang, C.-T.; Wong, D. S.-H. and Jang, S.-S., "Petri-net Based Scheduling Strategy for Semiconductor Manufacturing Processes", 2011, Chemical Engineering Research and Design, 89, 291-300.*

Li, L.; Sun, Z.; Zhou, M. and Qiao, F., "Adaptive Dispatching Rule for Semiconductor Wafer Fabrication Facility", Dec. 27, 2012, IEEE.*

Lin, S.-Y.; Fu, L.-C.; Chiang, T.-C. and Shen, Y.-S., "Colored Timed Petri-Net and GA Based Approach to Modeling and Scheduling for Wafer Probe Center", Sep. 14-19, 2003, Proceedings of the 2003 IEEE International Conference on Robotics and Automation.*

Qiao, Y.; Wu, N. and Zhou, M., "A Petri Net-Based Novel Scheduling Approach and Its Cycle Time Analysis for Dual-Arm Cluster Tools with Wafer Revisiting", Oct. 5, 2012, IEEE.*

Qiao, Y.; Wu, N. and Zhou, M., "Petri Net Modeling and Wafer Sojourn Time Analysis of Single-Arm Cluster Tools with Residency Time Constraint and Activity Time Variation", Aug. 2012, IEEE Transactions on Semiconductor Manufacturing, vol. 25, No. 3.*

Qiao, Y.; Wu, N. and Zhou, M., "Real-Time Scheduling of Single-Arm Cluster Tools Subject of Residency Time Constraints and Bounded Activity Time Variation", Jul. 2012, IEEE Transactions on Automation Science and Engineering, vol. 9, No. 3.*

Qiao, Y.; Wu, N. and Zhou, M., "Scheduling of Dual-Arm Cluster Tools with Wafer Revisiting and Residency Time Constraints", Jul. 10, 2013, IEEE.*

Qiao, Y.; Pan, C.-R.; Wu, N.-Q. and Zhou, M., "Response Policies to Process Module Failure in Single-Arm Cluster Tools Subject to Wafer Residency Time Constraints", Apr. 21, 2014, IEEE.*

Yang, F.; Wu, N.; Qiao, Y. and Zhou, M., Petri Net-Based Optimal One-Wafer Cyclic Scheduling of Hybrid Multi-Cluster Tools in Wafer Fabrication, Mar. 17, 2014, IEEE Transactions on Semiconductor Manufacturing, vol. 27, No. 2.*

Yang, F.; Wu, N.; Qiao, Y. and Zhou, M., "Petri Net-Based Polynomially Complex Approach to Optimal ONe-Wafer Cyclic Scheduling of Hybrid Multi-Cluster Tools in Semiconductor Manufacturing", Dec. 2014, IEEE Transactions on Systems, Man and Cybernetics, Systems, vol. 44, No. 12.*

Zhou, M., "Petri Net Modeling, Scheduling and Real-Time Control of Cluster Tools in Semiconductor Manufacturing", May 2010, New Jersey Institute of Technology, Discrete Event Systems Laboratory Department of Electrical and Computer Engineering.*

Zhu, Q.; Wu, N.; Qiao, Y. and Zhou, M., "Petri Net Modeling and One-Wafer Scheduling of Single-Arm Multi-Cluster Tools", Nov. 7, 2013, 2013 IEEE International Conference on Automation Science and Engineering (CASE).*

Zhu, Q.; Qiao, Y. and Zhou, M., "Petri Net Modeling and ONe-Wafer Scheduling of Single-Arm Tree-Like Multi-Cluster Tools", Aug. 24-28, 2015, 2015 IEEE International Conference on Automation Science and Engineering (CASE).*

Zhu, Q.; Wu, N.; Qiao, Y and Zhou, M., "Petri Net-Based Optimal One-Wafer Scheduling of Single-Arm Multi-Cluster Tools in Semiconductor Manufacturing", Nov. 2013, IEEE Transactions on Semiconductor Manufacturing, vol. 26, No. 4.*

Zhu Q.; Wu, N.; Qiao, Y. and Zhou, M., "Scheduling of Single-Arm Multi-Cluster Tools With Wafer Residency Time Constraints in Semiconductor Manufacturing", Dec. 2, 2014, IEEE.*

Zuberek, W.M., "Timed Petri Nets in Modeling and Analysis of Cluster Tools", Oct. 2001, IEEE Transactions on Robotics and Automation, vol. 17, No. 5.*

W. K. Chan, J. G. Yi, and S. W. Ding, "Optimal Scheduling of Multicluster Tools with Constant Robot Moving Times, Part I: Two-Cluster Analysis," IEEE Transactions on Automation Science and Engineering, vol. 8, No. 1, pp. 5-16, 2011a.

W. K. Chan, J. G. Yi, S. W. Ding, and D. Z. Song, "Optimal Scheduling of Multicluster Tools with Constant Robot Moving Times, Part II: Tree-Like Topology Configurations," IEEE Transactions on Automation Science and Engineering, vol. 8, No. 1, pp. 17-28, 2011b.

M. Dawande, C. Sriskandarajah, and S. P. Sethi, "On Throughput Maximization in Constant Travel-time Robotic Cells," Manufacture Service Operation Manage, vol. 4, No. 4, pp. 296-312, 2002.

S. W. Ding, J. G. Yi, and M. T. Zhang, "Multicluster Tools Scheduling: an Integrated Event Graph and Network Model Approach," IEEE Transactions on Semiconductor Manufacturing, vol. 19, No. 3, pp. 339-351, 2006.

Drobouchevitch, S. P. Sethi, and C. Sriskandarajah, "Scheduling Dual Gripper Robotic Cells: One-unit Cycles," European Journal of Operational Research, vol. 171, No. 2, pp. 598-631, 2006.

H. Geismar, C. Sriskandarajah, and N. Ramanan, "Increasing Throughput for Robotic Cells With Parallel Machines and Multiple Robots," IEEE Transactions on Automation Science and Engineering, vol. 1, No. 1, pp. 84-89, 2004.

J.-H. Kim, T.-E. Lee, H.-Y. Lee, and D.-B. Park, "Scheduling analysis of timed-constrained dual-armed cluster tools," IEEE Transactions on Semiconductor Manufacturing, vol. 16, No. 3, pp. 521-534, 2003.

J.-H. Lee, T.-E. Lee, "Concurrent processing of multiple wafer types in a single-armed cluster tool," IEEE Conference on Automation Science and Engineering, pp. 102-107, 2011.

T.-E. Lee, H.-Y. Lee, and Y.-H. Shin, "Workload balancing and scheduling of a single-armed cluster tool," in Proceedings of the 5th APIEMS Conference, Gold Coast, Australia, pp. 1-15, 2004.

T.-E. Lee and S.-H. Park, "An extended event graph with negative places and tokens for timed window constraints," IEEE Transactions on Automation Science and Engineering, vol. 2, No. 4, pp. 319-332, 2005.

M.-J. Lopez and S.-C. Wood, "Systems of multiple cluster tools—configuration, reliability, and performance," IEEE Transactions on Semiconductor Manufacturing, vol. 16, No. 2, pp. 170-178, 2003.

T. Murata, "Petri nets: Properties, analysis and applications," Proceedings of IEEE, vol. 77, No. 4, pp. 541-580, Apr. 1989.

T. L. Perkinson, P. K. MacLarty, R. S. Gyurcsik, and R. K. Cavin III, "Single-wafer cluster tool performance: An analysis of throughput," IEEE Transactions on Semiconductor Manufacturing, vol. 7, No. 3, pp. 369-373, 1994.

T. L. Perkinson, R. S. Gyurcsik, and P. K. MacLarty, "Single-wafer cluster tool performance: An analysis of the effects of redundant chambers and revisitations sequences on throughput," IEEE Transactions on Semiconductor Manufacturing, vol. 9, No. 3, pp. 384-400, 1996.

Y. Qiao, N. Q. Wu, and M.C. Zhou, "Petri Net Modeling and Wafer Sojourn Time Analysis of Single-Arm Cluster Tools With Resi- (56) References Cited

OTHER PUBLICATIONS dency Time Constraints and Activity Time Variation," IEEE Transactions on Semiconductor Manufacturing, vol. 25, No. 3, pp. 432-446, 2012a.

Y. Qiao, N. Q. Wu, and M. C. Zhou, "Real-Time Scheduling of Single-Arm Cluster Tools Subject to Residency Time Constraints and Bounded Activity Time Variation," IEEE Transactions on Automation Science and Engineering, vol. 9, No. 3, pp. 564-577, 2012b.

Y. Qiao, N. Q. Wu, and M. C. Zhou, "A Petri net-based Novel Scheduling Approach and Its Cycle Time Analysis for Dual-Arm Cluster Tools with Wafer Revisiting," IEEE Transactions on Semiconductor Manufacturing, vol. 26, No. 1, pp. 100-110, 2013.

S. Rostami, B. Hamidzadeh, and D. Camporese, "An optimal periodic scheduler for dual-arm robots in cluster tools with residency constraints," IEEE Transactions on Robotics and Automation, vol. 17, No. 5, pp. 609-618, 2001.

S. Venkatesh, R. Davenport, P. Foxhoven, and J. Nulman, "A steady state throughput analysis of cluster tools: Dual-blade versus single-blade robots," IEEE Transactions on Semiconductor Manufacturing, vol. 10, No. 4, pp. 418-424, 1997.

N. Q. Wu, "Necessary and Sufficient Conditions for Deadlock-free Operation in Flexible Manufacturing Systems Using a Colored Petri Net Model," IEEE Transaction on Systems, Man, and Cybernetics, Part C, vol. 29, No. 2, pp. 192-204, 1999.

N. Q. Wu, C. B. Chu, F. Chu, and M. C. Zhou, "A Petri net method for schedulability and scheduling problems in single-arm cluster tools with wafer residency time constraints," IEEE Transactions on Semiconductor Manufacturing, vol. 21, No. 2, pp. 224-237, 2008.

N.Q. Wu, F. Chu, C. B. Chu, and M. C. Zhou, "Petri net modeling and cycle time analysis of dual-arm cluster tools with wafer revisiting," IEEE Transactions on Systems, Man,& Cybernetics: Systems, vol. 43, No. 1, pp. 196-207, 2013a.

N. Q. Wu, F. Chu, C. Chu, and M. Zhou, "Petri Net-Based Scheduling of Single-Arm Cluster Tools With Reentrant Atomic Layer Deposition Processes," IEEE Transactions on Automation Science and Engineering, vol. 8, No. 1, pp. 42-55, 2011.

N. Q. Wu and M. C. Zhou, "Avoiding deadlock and reducing starvation and blocking in automated manufacturing systems based on a Petri net model," IEEE Transactions on Robotics and Automation, vol. 17, No. 5, 658-669, 2001.

N. Q. Wu and M. C. Zhou, "Modeling and deadlock control of automated guided vehicle systems," IEEE/ASME Transactions on Mechatronics, vol. 9, No. 1, pp. 50-57, 2004.

N. Q. Wu and M. C. Zhou, System modeling and control with resource-oriented Petri nets, CRC Press, Taylor & Francis Group, New York, Oct. 2009.

N. Q. Wu and M. Zhou, "Analysis of wafer sojourn time in dual-arm cluster tools with residency time constraint and activity time variation," IEEE Transactions on Semiconductor Manufacturing, vol. 23, No. 1, pp. 53-64, 2010a.

N. Q. Wu and M. C. Zhou, "A closed-form solution for schedulability and optimal scheduling of dual-arm cluster tools based on steady schedule analysis," IEEE Transactions on Automation Science and Engineering, vol. 7, No. 2, pp. 303-315, 2010b.

N. Q. Wu and M. C. Zhou, "Modeling, analysis and control of dual-arm cluster tools with residency time constraint and activity time variation based on Petri nets," IEEE Transactions on Automation Science and Engineering, vol. 9, No. 2, 446-454, 2012a.

N. Q. Wu and M. C. Zhou, "Schedulability analysis and optimal scheduling of dual-arm cluster tools with residency time constraint and activity time variation," IEEE Transactions on Automation Science and Engineering, vol. 9, No. 1, pp. 203-209, 2012b.

N. Q. Wu, M. C. Zhou, F. Chu, and C. B. Chu, "A Petri-net-based scheduling strategy for dual-arm cluster tools with wafer revisiting," IEEE Transactions on Systems, Man,& Cybernetics: Systems,, vol. 43, No. 5, pp. 1182-1194, Sep. 2013b.

N. Q. Wu, M. C. Zhou, and Z. W. Li, Resource-oriented Petri net for deadlock avoidance in flexible assembly systems, IEEE Transactions on System, Man, & Cybernetics, Part A, vol. 38, No. 1, 56-69, 2008b.

F. J. Yang, N. Q. Wu, Y. Qiao, and M. C. Zhou, Optimal one-wafer cyclic scheduling of single-arm multi-cluster tools with two-space buffering modules, IEEE Transactions on Systems, Man, & Cybernetics: Systems, vol. 44, No. 12, 1584-1597, 2014.

J. Yi, S. Ding, and D. Song, "Steady-state throughput and scheduling analysis of multi-cluster tools for semiconductor manufacturing: A decomposition approach," in Proceedings of 2005 IEEE International Conference on Robotics and Automation, pp. 292-298, 2005.

J. G. Yi, S. W. Ding, D. Z. Song, and M. T. Zhang, "Steady-State Throughput and Scheduling Analysis of Multi-Cluster Tools for Semiconductor Manufacturing: A Decomposition Approach," IEEE Transactions on Automation Science and Engineering, vol. 5, No. 2, pp. 321-336, 2008.

M. C. Zhou and M. D. Jeng, "Modeling, Analysis, Simulation, Scheduling, and Control of Semiconductor Manufacturing Systems: A Petri Net Approach," IEEE Transactions on Semiconductor Manufacturing, vol. 11, No. 3, pp. 333-357, 1998.

W. M. Zuberek, "Timed Petri nets in modeling and analysis of cluster tools," IEEE Transactions on Robotics Automation, vol. 17, No. 5, pp. 562-575, Oct. 2001.

Q. H. Zhu, N. Q. Wu, Y. Qiao, and M. C. Zhou, "Scheduling of Single-Arm Multi-Cluster Tools to Achieve the Minimum Cycle Time," in Proceedings of 2013 IEEE International Conference on Robotics and Automation, Karlsruhe, Germany, pp. 3555-3560, May 2013a.

Q. H. Zhu, N. Q. Wu, Y. Qiao, and M. C. Zhou, "Petri Net-Based Optimal One-Wafer Scheduling of Single-Arm Multi-Cluster Tools in Semiconductor Manufacturing," IEEE Transactions on Semiconductor Manufacturing, vol. 26, No. 4, pp. 578-591, 2013b.

Q. H. Zhu, N. Q. Wu, Y. Qiao, and M. C. Zhou, "Modeling and Schedulability Analysis of Single-Arm Multi-Cluster Tools with Residency Time Constraints via Petri Nets" in Proc. IEEE Int. Conf. Auto. Sci. Eng., Taipei, Taiwan, pp. 81-86, 2014.

Q. H. Zhu, N. Q. Wu, Y. Qiao, and M. C. Zhou, "Scheduling of Single-Arm Multi-cluster Tools With Wafer Residency Time Constraints in Semiconductor Manufacturing" IEEE Transactions on Semiconductor Manufacturing, vol. 28, No. 1, 2015.

* cited by examiner

OPTIMAL ONE-WAFER SCHEDULING OF SINGLE-ARM MULTI-CLUSTER TOOLS WITH TREE-LIKE TOPOLOGY

CROSS-REFERENCE TO RELATED APPLICATIONS

This application claims the benefit of U.S. Provisional Patent Application No. 62/221,035, filed on Sep. 20, 2015, which is incorporated by reference herein in its entirety.

LIST OF ABBREVIATIONS

BM buffer module
CTC cluster-tool-chain
FP fundamental period
LL loadlock
PM process module
PN Petri net
R robot
ROPN resource-oriented PN

BACKGROUND

Field of the Invention

The present invention generally relates to scheduling a tree-like multi-cluster tool. In particular, the present invention relates to a method for scheduling this multi-cluster tool to thereby generate an optimal one-wafer cyclic schedule.

List of References

There follows a list of references that are occasionally cited in the specification. Each of the disclosures of these references is incorporated by reference herein in its entirety.

W. K. Chan, J. G. Yi, and S. W. Ding, "Optimal Scheduling of Multicluster Tools with Constant Robot Moving Times, Part I: Two-Cluster Analysis," *IEEE Transactions on Automation Science and Engineering*, vol. 8, no. 1, pp. 5-16, 2011a.

W. K. Chan, J. G. Yi, S. W. Ding, and D. Z. Song, "Optimal Scheduling of Multicluster Tools with Constant Robot Moving Times, Part II: Tree-Like Topology Configurations," *IEEE Transactions on Automation Science and Engineering*, vol. 8, no. 1, pp. 17-28, 2011b.

T. H. Cormen, C. E. Leiserson, R. L. Rivest, and C. Stein, *Introduction to algorithms*: MIT press, 2001.

M. Dawande, C. Sriskandarajah, and S. P. Sethi, "On Throughput Maximization in Constant Travel-time Robotic Cells," *Manufacture Service Operation Manage*, vol. 4, no. 4, pp. 296-312, 2002.

S. W. Ding, J. G. Yi, and M. T. Zhang, "Multicluster Tools Scheduling: an Integrated Event Graph and Network Model Approach," *IEEE Transactions on Semiconductor Manufacturing*, vol. 19, no. 3, pp. 339-351, 2006.

I. Drobouchevitch, S. P. Sethi, and C. Sriskandarajah, "Scheduling Dual Gripper Robotic Cells: One-unit Cycles," *European Journal of Operational Research*, vol. 171, no. 2, pp. 598-631, 2006.

H. Geismar, C. Sriskandarajah, and N. Ramanan, "Increasing Throughput for Robotic Cells With Parallel Machines and Multiple Robots," *IEEE Transactions on Automation Science and Engineering*, vol. 1, no. 1, pp. 84-89, 2004.

J. -H. Kim, T. -E. Lee, H. -Y. Lee, and D. -B. Park, "Scheduling analysis of timed-constrained dual-armed cluster tools," *IEEE Transactions on Semiconductor Manufacturing*, vol. 16, no. 3, pp. 521-534, 2003.

J. -H. Lee, T. -E. Lee, "Concurrent processing of multiple wafer types in a single-armed cluster tool," *IEEE Conference on Automation Science and Engineering*, pp. 102-107, 2011.

T. -E. Lee, H. -Y. Lee, and Y. -H. Shin, "Workload balancing and scheduling of a single-armed cluster tool," in *Proceedings of the 5th APIEMS Conference*, Gold Coast, Australia, pp. 1-15, 2004.

T. -E. Lee and S. -H. Park, "An extended event graph with negative places and tokens for timed window constraints," *IEEE Transactions on Automation Science and Engineering*, vol. 2, no. 4, pp. 319-332, 2005.

M. -J. Lopez and S. -C. Wood, "Systems of multiple cluster tools—configuration, reliability, and performance," *IEEE Transactions on Semiconductor Manufacturing*, vol. 16, no. 2, pp. 170-178, 2003.

T. Murata, "Petri nets: Properties, analysis and applications," *Proceedings of IEEE*, vol. 77, no. 4, pp. 541-580, April 1989.

M. X. Liu and B. H. Zhou, "Modelling and scheduling analysis of multi-cluster tools with residency constraints based on time constraint sets". *International Journal of Production Research*, vol. 51, no. 16, pp. 4835-4852, 2013.

T. L. Perkinson, P. K. MacLarty, R. S. Gyurcsik, and R. K. Cavin III, "Single-wafer cluster tool performance: An analysis of throughput," *IEEE Transactions on Semiconductor Manufacturing*, vol. 7, no. 3, pp. 369-373, 1994.

T. L. Perkinson, R. S. Gyurcsik, and P. K. MacLarty, "Single-wafer cluster tool performance: An analysis of the effects of redundant chambers and revisitations sequences on throughput," *IEEE Transactions on Semiconductor Manufacturing*, vol. 9, no. 3, pp. 384-400, 1996.

Y. Qiao, N. Q. Wu, and M. C. Zhou, "Petri Net Modeling and Wafer Sojourn Time Analysis of Single-Arm Cluster Tools With Residency Time Constraints and Activity Time Variation," *IEEE Transactions on Semiconductor Manufacturing*, vol. 25, no. 3, pp. 432-446, 2012a.

Y. Qiao, N. Q. Wu, and M. C. Zhou, "Real-Time Scheduling of Single-Arm Cluster Tools Subject to Residency Time Constraints and Bounded Activity Time Variation," *IEEE Transactions on Automation Science and Engineering*, vol. 9, no. 3, pp. 564-577, 2012b.

Y. Qiao, N. Q. Wu, and M. C. Zhou, "A Petri netbased Novel Scheduling Approach and Its Cycle Time Analysis for Dual-Arm Cluster Tools with Wafer Revisiting," *IEEE Transactions on Semiconductor Manufacturing*, vol. 26, no. 1, pp. 100-110, 2013.

S. Rostami, B. Hamidzadeh, and D. Camporese, "An optimal periodic scheduler for dual-arm robots in cluster tools with residency constraints," *IEEE Transactions on Robotics and Automation*, vol. 17, no. 5, pp. 609-618, 2001.

S. Venkatesh, R. Davenport, P. Foxhoven, and J. Nulman, "A steady state throughput analysis of cluster tools: Dual-blade versus single-blade robots," *IEEE Transactions on Semiconductor Manufacturing*, vol. 10, no. 4, pp. 418-424, 1997.

N. Q. Wu, "Necessary and Sufficient Conditions for Deadlock-free Operation in Flexible Manufacturing Systems Using a Colored Petri Net Model," *IEEE Transaction on Systems, Man, and Cybernetics, Part C*, vol. 29, no. 2, pp. 192-204, 1999.

N. Q. Wu, C. B. Chu, F. Chu, and M. C. Zhou, "A Petri net method for schedulability and scheduling problems in single-arm cluster tools with wafer residency time constraints," *IEEE Transactions on Semiconductor Manufacturing*, vol. 21, no. 2, pp. 224-237, 2008.

N. Q. Wu, F. Chu, C. B. Chu, and M. C. Zhou, "Petri net modeling and cycle time analysis of dual-arm cluster tools with wafer revisiting," *IEEE Transactions on Systems, Man, & Cybernetics*: Systems, vol. 43, no. 1, pp. 196-207, 2013a.

N. Q. Wu, F. Chu, C. Chu, and M. Zhou, "Petri Net-Based Scheduling of Single-Arm Cluster Tools With Reentrant Atomic Layer Deposition Processes," *IEEE Transactions on Automation Science and Engineering*, vol. 8, no. 1, pp. 42-55, 2011.

N. Q. Wu, F. Chu, C. B. Chu, and M. C. Zhou, "Petri net modeling and cycle time analysis of dual-arm cluster tools with wafer revisiting," *IEEE Transactions on Systems, Man, & Cybernetics*: Systems, vol. 43, no. 1, pp. 196-207, 2013b.

N. Q. Wu and M. C. Zhou, "Avoiding deadlock and reducing starvation and blocking in automated manufacturing systems based on a Petri net model," *IEEE Transactions on Robotics and Automation*, vol. 17, no. 5, 658-669, 2001.

N. Q. Wu and M. C. Zhou, "Modeling and deadlock control of automated guided vehicle systems," *IEEE/ASME Transactions on Mechatronics*, vol. 9, no. 1, pp. 50-57, 2004.

N. Q. Wu and M. C. Zhou, *System modeling and control with resource-oriented Petri nets*, CRC Press, Taylor & Francis Group, New York, October 2009.

N. Q. Wu and M. Zhou, "Analysis of wafer sojourn time in dual-arm cluster tools with residency time constraint and activity time variation," *IEEE Transactions on Semiconductor Manufacturing*, vol. 23, no. 1, pp. 53-64, 2010a.

N. Q. Wu and M. C. Zhou, "A closed-form solution for schedulability and optimal scheduling of dual-arm cluster tools based on steady schedule analysis," *IEEE Transactions on Automation Science and Engineering*, vol. 7, no. 2, pp. 303-315, 2010b.

N. Q. Wu and M. C. Zhou, "Modeling, analysis and control of dual-arm cluster tools with residency time constraint and activity time variation based on Petri nets," *IEEE Transactions on Automation Science and Engineering*, vol. 9, no. 2, 446-454, 2012a.

N. Q. Wu and M. C. Zhou, "Schedulability analysis and optimal scheduling of dual-arm cluster tools with residency time constraint and activity time variation," *IEEE Transactions on Automation Science and Engineering*, vol. 9, no. 1, pp. 203-209, 2012b.

N. Q. Wu, M. C. Zhou, F. Chu, and C. B. Chu, "A Petri-net-based scheduling strategy for dual-arm cluster tools with wafer revisiting," *IEEE Transactions on Systems, Man, & Cybernetics: Systems*, vol. 43, no. 5, pp. 1182-1194, September 2013b.

N. Q. Wu, M. C. Zhou, and Z. W. Li, Resource-oriented Petri net for deadlock avoidance in flexible assembly systems, *IEEE Transactions on System, Man, & Cybernetics, Part A*, vol. 38, no. 1, 56-69, 2008b.

F. J. Yang, N. Q. Wu, Y. Qiao, and M. C. Zhou, Optimal one-wafer cyclic scheduling of single-arm multi-cluster tools with two-space buffering modules, *IEEE Transactions on Systems, Man, & Cybernetics: Systems*, vol. 44, no. 12, 1584-1597, 2014.

J. Yi, S. Ding, and D. Song, "Steady-state throughput and scheduling analysis of multi-cluster tools for semiconductor manufacturing: A decomposition approach," in *Proceedings of 2005 IEEE International Conference on Robotics and Automation*, pp. 292-298, 2005.

J. G. Yi, S. W. Ding, D. Z. Song, and M. T. Zhang, "Steady-State Throughput and Scheduling Analysis of Multi-Cluster Tools for Semiconductor Manufacturing: A Decomposition Approach," *IEEE Transactions on Automation Science and Engineering*, vol. 5, no. 2, pp. 321-336, 2008.

M. C. Zhou and M. D. Jeng, "Modeling, Analysis, Simulation, Scheduling, and Control of Semiconductor Manufacturing Systems: A Petri Net Approach," *IEEE Transactions on Semiconductor Manufacturing*, vol. 11, no. 3, pp. 333-357, 1998.

W. M. Zuberek, "Timed Petri nets in modeling and analysis of cluster tools," *IEEE Transactions on Robotics Automation*, vol. 17, no. 5, pp. 562-575, October 2001.

Q. H. Zhu, N. Q. Wu, Y. Qiao, and M. C. Zhou, "Scheduling of Single-Arm Multi-Cluster Tools to Achieve the Minimum Cycle Time," in *Proceedings of 2013 IEEE International Conference on Robotics and Automation*, Karlsruhe, Germany, pp. 3555-3560, May 2013a.

Q. H. Zhu, N. Q. Wu, Y. Qiao, and M. C. Zhou, "Petri Net-Based Optimal One-Wafer Scheduling of Single-Arm Multi-Cluster Tools in Semiconductor Manufacturing," *IEEE Transactions on Semiconductor Manufacturing*, vol. 26, no. 4, pp. 578-591, 2013b.

Q. H. Zhu, N. Q. Wu, Y. Qiao, and M. C. Zhou, "Modeling and Schedulability Analysis of Single-Arm Multi-Cluster Tools with Residency Time Constraints via Petri Nets" in *Proc. IEEE Int. Conf. Auto. Sci. Eng.*, Taipei, Taiwan, pp. 81-86, 2014.

Q. H. Zhu, N. Q. Wu, Y. Qiao, and M. C. Zhou, "Scheduling of Single-Arm Multi-cluster Tools With Wafer Residency Time Constraints in Semiconductor Manufacturing" *IEEE Transactions on Semiconductor Manufacturing*, vol. 28, no. 1, 2015.

There follows a list of patent(s) and patent application(s) that are occasionally cited in the specification.

D. Jevtic, "Method and Apparatus for Managing Scheduling a Multiple Cluster Tool," European Patent Application Publication No. 1,132,792 A2, Sep. 12, 2001.

D. Jevtic and S. Venkatesh, "Method and Apparatus for Scheduling Wafer Processing within a Multiple Chamber Semiconductor Wafer Processing Tool Having a Multiple Blade Robot," U.S. Pat. No. 6,224,638 B1, May 1, 2001.

Description of Related Art

With single wafer processing technology, cluster tools are increasingly used in the semiconductor industry. Generally, a single-cluster tool is composed of four to six process modules (PM), one wafer-delivering robot (R), and two loadlocks (LL) for cassette loading/unloading. The robot can be single or dual-arm one resulting in single or dual-arm cluster tools. Several single-cluster tools are connected together by shared buffer modules (BMs) to form a more integrated manufacturing system called a multi-cluster tool. It has higher performance and becomes more and more popular in the semiconductor industry. However, it is very challenging to effectively operate such a system.

Extensive studies have been done on modeling, performance evaluation, and scheduling for single-cluster tools [Kim et al., 2003; Lee et al., 2004; Lee and Park, 2005; Lopez and Wood, 2003; Wu et al., 2008a; Wu and Zhou, 2010b; Qiao et al., 2012a and 2012b; and Wu et al., 2013a and 2013b]. It is found that a cluster tool may operate in process-bound or transport-bound region. For a single-cluster tool, if one of its process steps is the bottleneck of the tool in the sense of workload, it is process-bound. In this case, the cycle time of the system is determined by the wafer processing time. Otherwise, if the robot is the bottleneck, it is transport-bound and the cycle time is determined by the robot task time. In practice, the robot task time is much shorter than the wafer processing time [Kim et al., 2003; and Lopez and Wood, 2003] such that, for a single-arm cluster tool, a backward strategy is shown to be optimal [Lee et al., 2004; Dawande 2002; and Lopez and Wood, 2003]. Some wafer fabrication processes require that a processed wafer should leave a PM within a given time interval, which is called wafer residency time constraints [Kim et al., 2003; Lee and Park, 2005]. Without immediate buffer between the PMs in a tool, this greatly complicates the problem of scheduling single-cluster tools. This problem is studied by using Petri nets and mathematical programming models for dual-arm cluster tools to find an optimal periodic schedule in [Kim et al., 2003; Lee and Park, 2005]. It is further studied for both single and dual-arm cluster tools in [Wu et al., 2008; Wu and Zhou, 2010b; and Qiao et al., 2012a and 2012b] by developing generic Petri net (PN) models. With these models, robot waiting is explicitly modeled as an event to parameterize a schedule by robot waiting time. Then, to find a schedule is to determine the robot waiting time. With these models, schedulability conditions are presented and closed-form scheduling algorithms are given to find an optimal periodic schedule if schedulable.

In recent years, attention has been paid to the problem of scheduling multi-cluster tools. A multi-cluster tool composed of K single-cluster tools is called a K-cluster tool. A heuristic method is proposed in [Jevtic, 2001] for it by dynamically assigning priorities to PMs. However, the performance of such a schedule is difficult to evaluate. Geismar et al. examine a serial 3-cluster tool composed of single-arm tools and parallel processing modules. By simulation, they find that, for 87% of instances, the backward strategy achieves the lower-bound of cycle time. In [Ding et al., 2006], an event graph model is used to describe the dynamic behavior of the system and a simulation-based search method is proposed to find a periodic schedule.

To reduce the computational complexity, without considering the robot moving time, a decomposition method is proposed in [Yi et al., 2005 and 2008]. By this method, the fundamental period (FP) for each tool is calculated as done for scheduling single-cluster tools. Then, by analyzing time delays resulting from accessing the shared buffers, the global fundamental period, or the cycle time for the system is determined. In this way, a schedule is found.

With robot moving time considered, a polynomial algorithm is presented to find a multi-wafer schedule for a serial multi-cluster tool in [Chan et al., 2011a]. A K-cluster tool is said to be process-dominant if its bottleneck tool is process-bound. It is known that there is always an optimal one-wafer schedule for a process-dominant serial multi-cluster tool [Zhu et al., 2013a, 2012; and Zhu et al., 2013b]. In studying the effect of buffer spaces in BMs on productivity, Yang et al. [2014] show that, for a process-dominant serial multi-cluster tool with two-space BMs, there is a one-wafer cyclic schedule such that the lower bound of cycle time is reached. For a single-arm multi-cluster tool with two-space BMs and wafer residency time constraints, Liu and Zhou [2013] propose a non-linear programming model and a heuristic algorithm to solve it. For a single-arm multi-cluster tool with single-space BMs and wafer residency time constraints, Zhu et al. [2014 and 2015] present sufficient and necessary schedulability conditions and an efficient algorithm to find a one-wafer optimal cyclic schedule if schedulable.

Chan et al. [2011b] study the problem of scheduling a tree-like multi-cluster tool, which is the only report on tree-like multi-cluster tool scheduling to our best knowledge. The obtained schedule is a multi-wafer cyclic one. It derives conditions under which a tree-like multi-cluster tool can be scheduled by a decomposition method. Further, if decomposable, conditions under which a backward scheduling strategy is optimal are presented.

Since a one-wafer cyclic schedule is easy to implement and understand by a practitioner, it gives rise to a question if there exists a one-wafer cyclic schedule for a tree-like multi-cluster tool and how such a schedule can be found if it exists. There is a need in the art to derive the conditions for which this schedule exists and to develop a method for scheduling a tree-like multi-cluster tool with a one-wafer cyclic schedule.

SUMMARY OF THE INVENTION

An aspect of the present invention is to provide a computer-implemented method for scheduling a tree-like multi-cluster tool to generate a one-wafer cyclic schedule. The multi-cluster tool comprises plural single-cluster tools each having a robot for wafer handling, and is decomposable into a plurality of CTCs each having a serial topology.

The method comprises determining robot waiting times for the robots. In particular, the method makes use of Theorem 1 detailed below to determine the robot waiting times.

Preferably, a CTC-Check algorithm as detailed hereinafter computes candidate values of the robot waiting times for at least one individual CTC. The CTC-Check algorithm is configured to compute these candidate values such that the robot waiting time at a last processing step of each single-cluster tool in the individual CTC apart from the leaf tool therein is minimized.

With the use of the CTC-Check algorithm, the robot waiting times may be determined according to Algorithms 1 and 2 detailed below.

Other aspects of the present invention are disclosed as illustrated by the embodiments hereinafter.

DETAILED DESCRIPTION

Since a one-wafer cyclic schedule is easy to implement and understand by a practitioner, it gives rise to a question if there exists a one-wafer cyclic schedule for a tree-like multi-cluster tool and how such a schedule can be found if it exists. The present work provides a solution of schedulability and a method for scheduling the tree-like multi-cluster tool with the one-wafer cyclic schedule. Since the robot task time is much shorter than the wafer processing time in practice [Kim et al., 2003; and Lopez and Wood, 2003], it is reasonable to assume that the bottleneck tool of a multi-cluster tool is process-bound, or it is process-dominant. Hence, we address a process-dominant tree-like multi-cluster tool in this work. The key for scheduling a K-cluster tool is to coordinate the activities of the multiple robots in accessing the BMs. In scheduling single-cluster tools, Wu et al. [2008] and Wu and Zhou [2010a] find that it is crucial to determine when a robot should wait and how long it should wait if necessary. By following this idea, the present work develops a PN model for a tree-like multi-cluster tool with the robot waiting being explicitly modeled. With the model, a schedule for the system is parameterized by the robot waiting time. For a process-dominant tree-like multi-cluster tool, necessary and sufficient conditions under which a one-wafer cyclic schedule exists are derived. It is then shown that there is always a one-wafer cyclic schedule. An efficient algorithm is developed and disclosed herein to find the minimal cycle time and the one-wafer cyclic schedule.

A. System Modeling by Petri Net

A.1. Tree-like Multi-cluster Tool

Figure 1:
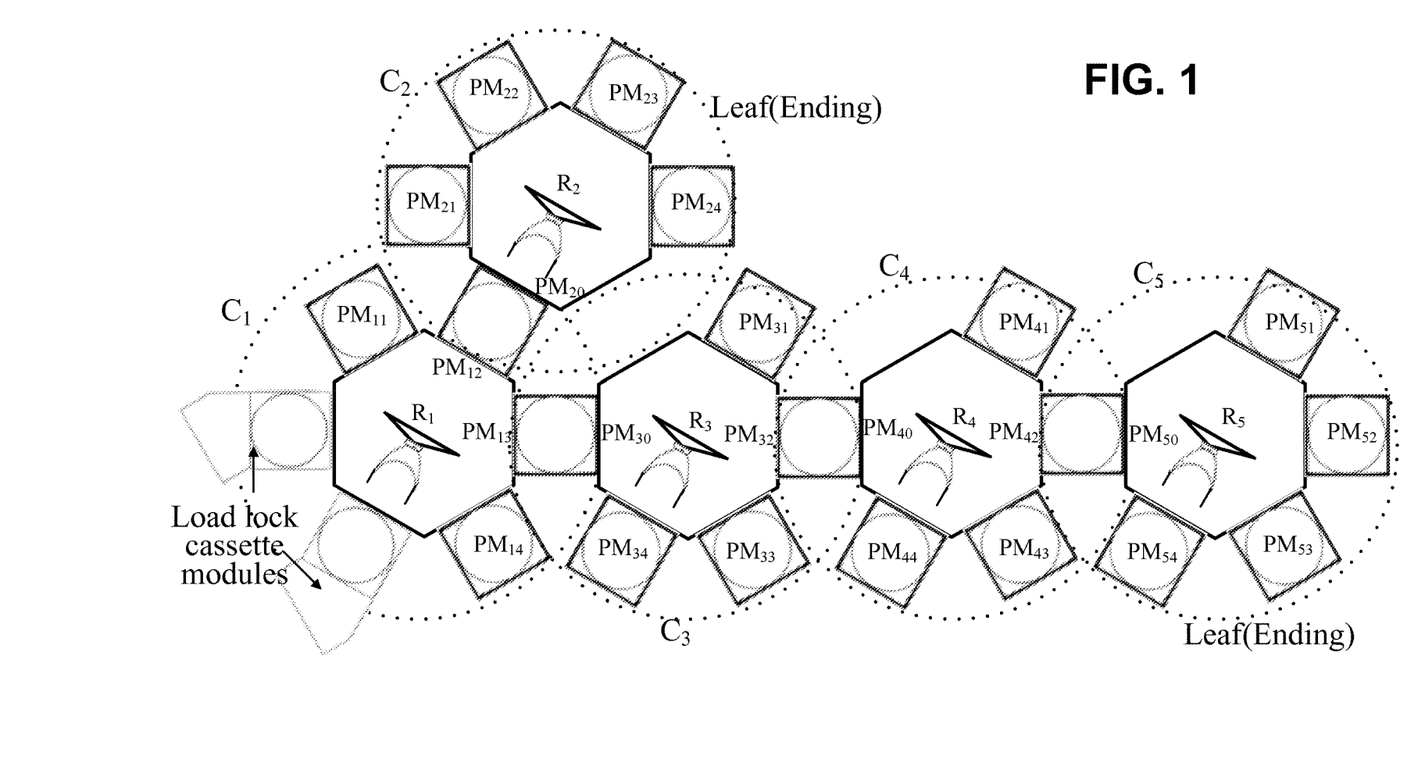
FIG. 1 depicts an example of a tree-like multi-cluster tool.

The configuration of a tree-like multi-cluster tool is illustrated in FIG. 1. A tree-like multi-cluster tool composed of K single-cluster tools is called a K-tree-cluster tool. It follows from Chan et al. [2011b] that a K-tree-cluster tool can be described as follows. Let $N_K = \{1, 2, \ldots, K\}$ be the index set of the cluster tools that form a K-tree-cluster tool. The tool with the LLs in it is called the "root" and is denoted by $C_1$. If $C_i$, $i \in N_K \setminus \{1\}$, has only one adjacent tool, it is called a leaf tool. From $C_1$ to each leaf, there is a directed path. On such a path, if $C_i$ is closer to $C_1$ than $C_j$, $C_i$ is the upstream tool of $C_j$.

As done in [Chan et al. 2011b], for a K-tree-cluster tool, we assume: 1) the root has two LLs; 2) a BM shared by two adjacent tools can hold one wafer at a time without a processing function; 3) a PM can process one wafer at a time; 4) all the wafers in a cassette should be processed in an identical sequence specified in the recipe and visit a PM no more than once (except for a BM); 5) the loading, unloading, moving time of the robots, and the processing time of a wafer at a PM are deterministic and known; 6) the loading and unloading time of a robot is same, and the robot moving time from a PM to another is also same regardless of whether it carries a wafer or not; and 7) there is no parallel module, or only one PM is configured for each processing step.

With two LLs, while one lot of wafers in one LL is being processed, the other LL can be used for loading/unloading another lot of wafers. In this way, a multi-cluster tool can work consecutively without interruption. Thus, it operates in a steady state at most of time and there are always wafers to be processed. This is equivalent to that the LLs have infinite capacity.

A.2. Operation Process

The wafer fabrication process can be illustrated by the 5-tree-cluster tool shown in FIG. 1. With the LL and BMs being treated as a step, let $PS_{ij}$ denote the j-th step in $C_i$. Then, the processing route of a wafer is:
$PS_{10}$ (LL)$\rightarrow PS_{11} \rightarrow PS_{12}(PS_{20}) \rightarrow PS_{21} \rightarrow PS_{22} \rightarrow PS_{23} \rightarrow PS_{24} \rightarrow PS_{20}$ $(PS_{12}) \rightarrow PS_{13} \rightarrow (PS_{30}) \rightarrow PS_{31} \rightarrow PS_{32}$ $(PS_{40}) \rightarrow PS_{41} \rightarrow PS_{42}$ $(PS_{50}) \rightarrow PS_{51} \rightarrow PS_{52} \rightarrow PS_{53} \rightarrow PS_{54} \rightarrow PS_{50}$ $(PS_{42}) \rightarrow PS_{43} \rightarrow PS_{44} \rightarrow PS_{40}$ $(PS_{32}) \rightarrow PS_{33} \rightarrow PS_{34} \rightarrow PS_{30}$ $(PS_{13}) \rightarrow PS_{14} \rightarrow PS_{10}$ (LL).

In $C_i$, $i \in N_K \setminus \{1\}$, the BM denoted as $PM_{i0}$ can be viewed as a virtual LL for injecting wafers from an upstream tool, while the other BM(s) $PM_{ij}$ (j>0) can be viewed as a virtual process module(s). The BM shared by adjacent tools $C_i$ and $C_j$ is called an outgoing buffer for $C_i$ and an incoming one for $C_j$. The LLs in $C_1$ can be treated as an incoming buffer with infinite capacity. There are a number of processing steps in each individual tool and a BM connecting two tools is treated as a processing step with processing time being zero. Let $\Psi$ denote the index set of leaf tools and $DI(C_i)$ the index set of the immediate downstream tools of $C_i$ ($i \notin \Psi$). We have $DI(C_i) = \emptyset$ if $i \in \Psi$. Further, let $PM_{i(b[i,k])}$ denote the BM shared by $C_i$ and $C_k$, $k \in DI(C_i)$, with $PM_{k0}$ being the incoming buffer or virtual LL for $C_k$. It is called Step b[i,k] for $C_i$ and Step 0 for $C_k$, respectively. Assume that, except the incoming buffer, there are n[i] steps in $C_i$. Then, there are n[i]+1 steps in $C_i$ denoted as $PS_{i0}$, $PS_{i1}$, ..., $PS_{i(n[i])}$ with $PS_{i0}$ and $PS_{i(b[i,k])}$ being the incoming and outgoing steps. Let $R_i$ denote the robot in $C_i$. As discussed above, at most of time, a multi-cluster tool operates in a steady state. Under such a state, for a process-dominant multi-cluster tool, a backward strategy [Dawande 2002] is optimal for each individual tool.

A.3. Modeling the Wafer Flow

We model a multi-cluster tool system by extending the resource-oriented PN (ROPN) proposed in [Wu, 1999; Wu et al., 2008a and 2008b; and Wu and Zhou, 2009]. It is a finite capacity PN=(P, T, I, O, M, K), where P is a finite set of places; T is a finite set of transitions, $P \cup T \neq \emptyset$, and $P \cap T = \emptyset$; $I: P \times T \rightarrow N = \{0, 1, 2, \ldots\}$ is an input function; $O: P \times T \rightarrow N$ is an output function; $M: P \rightarrow N$ is a marking denoting the number of tokens in P with $M_0$ being the initial marking; and $K: P \rightarrow N \setminus \{0\}$ is a capacity function with K(p) being the number of tokens that p can hold at a time. The basic concept, transition enabling and firing rules of Petri nets (PN) can be found in [Zhou et al., 1998; Wu and Zhou, 2009].

Figure 2:
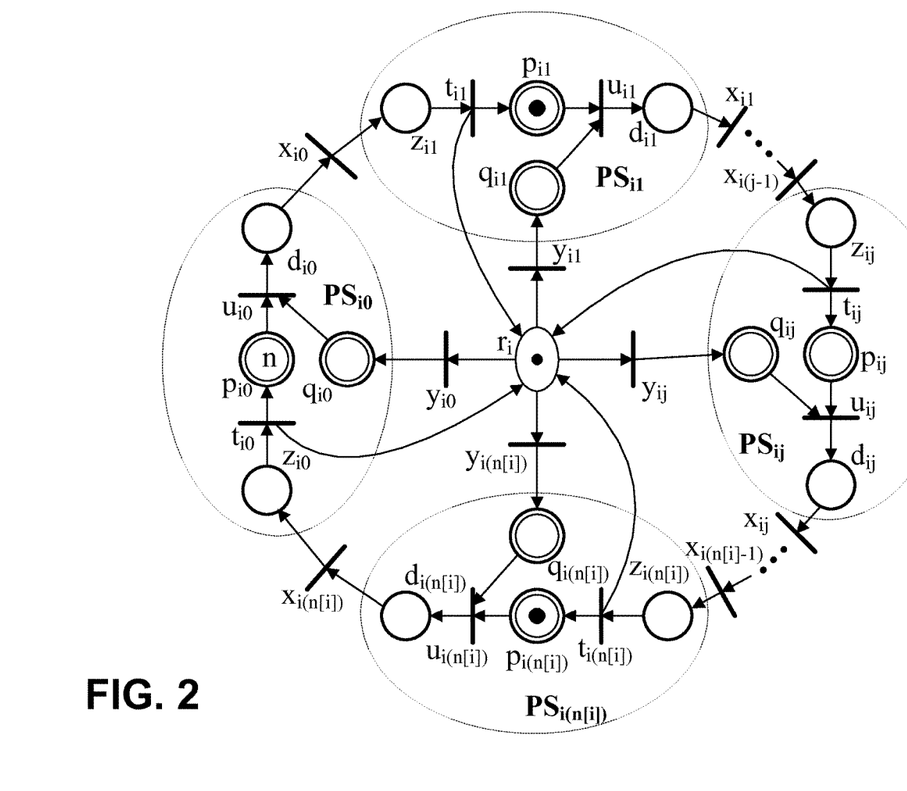
FIG. 2 depicts a PN model for an individual cluster tool $C_i$ as an illustrative example.

To model a multi-cluster tool, one needs to model the individual tools and the BMs. The behavior of Step j in $C_i$ is modeled as follows. The PM for Step j in $C_i$ with $i \neq 1$ and $j \neq 0$ is modeled by timed place $p_{ij}$ with $K(p_{ij}) = 1$. Place $p_{10}$ models the LLs in $C_1$ with $K(p_{10}) = \infty$. Places $z_{ij}$ and $d_{ij}$ model $R_i$'s holding a wafer (token) for loading into $p_{ij}$ and moving from Steps j to j+1 (or Step 0 if j=n[i]), respectively. Place $q_{ij}$ models $R_i$'s waiting at Step j for unloading a wafer there. Transitions $t_{ij}$ and $u_{ij}$ model $R_i$'s loading and unloading a wafer into and from $PM_{ij}$, respectively. Then, with arcs $(z_{ij}, t_{ij})$, $(t_{ij}, p_{ij})$, $(p_{ij}, u_{ij})$, $(q_{ij}, u_{ij})$, and $(u_{ij}, d_{ij})$, of the PN model for Step j in $C_i$ is obtained as shown in FIG. 2.

With the model for a step as a module, tool $C_i$ is modeled as follows. Place $r_i$ models $R_i$ with $K(r_i) = 1$, meaning that, with only one arm, the robot can hold one wafer at a time. Timed $y_{ij}$ with arcs $(r_i, y_{ij})$ and $(y_{ij}, q_{ij})$ for connecting $r_i$ and $q_{ij}$, representing that $R_i$ moves from Steps j+2 to j, j=0, 1, ..., n[i]−2 ($y_{i(n[i]-1)}$ for moving from Steps 0 to n[i]−1, and $y_{i(n[i])}$ for moving from Steps 1 to n[i]). Finally, $x_{ij}$, j=0, 1, 2, ..., n[i]−1, are added between $d_{ij}$ and $z_{i(j+1)}$ with arcs $(d_{ij}, x_{ij})$ and $(x_{ij}, z_{i(j+1)})$; and $x_{i(n[i])}$ is added between $d_{i(n[i])}$ and $z_{i0}$ with arcs $(d_{i(n[i])}, x_{i(n[i])})$ and $(x_{i(n[i])}, z_{i0})$. In this way, the modeling of $C_i$ is completed as shown in FIG. 2.

Figure 3:
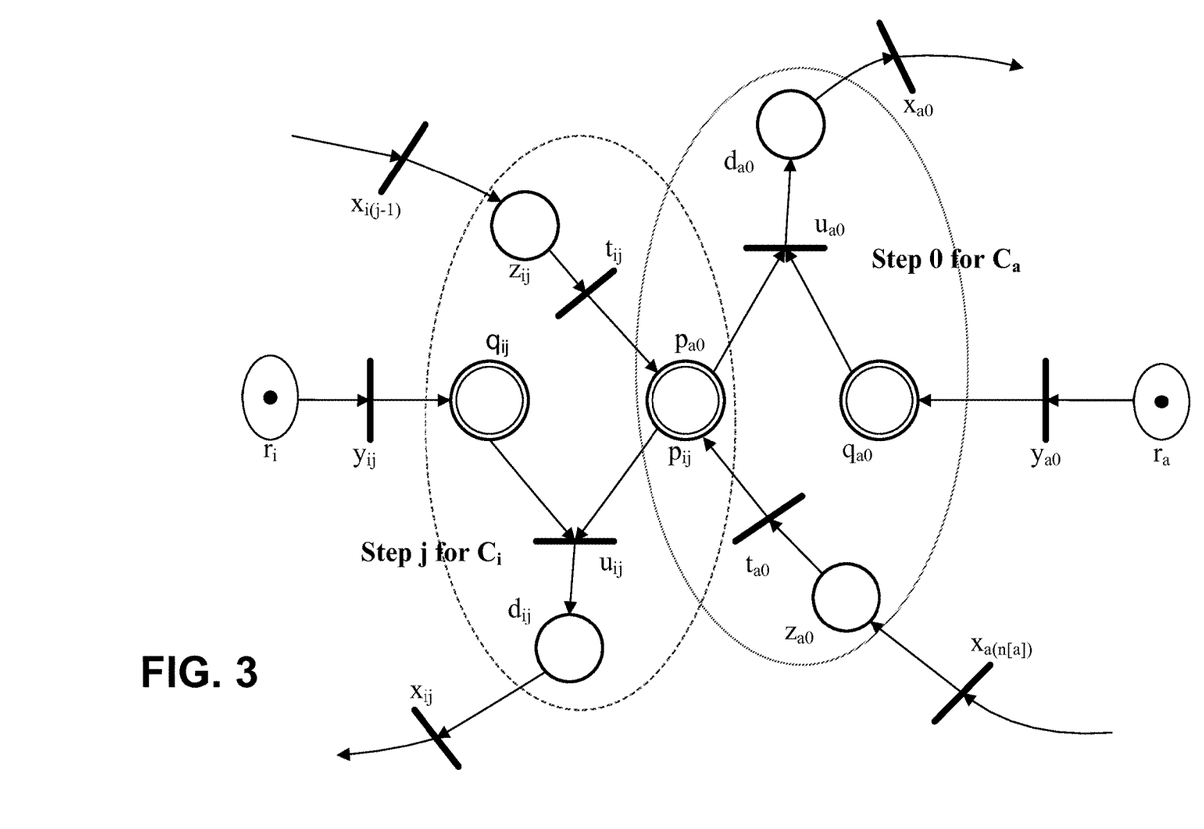
FIG. 3 depicts a PN model for a BM shared by adjacent clusters $C_i$ and $C_a$ as an illustrative example.

A BM linking $C_i$ and $C_a$, $a \in DI(C_i)$, is denoted by $PM_{i(b[i,a])}$ in $C_i$ and $PM_{a0}$ in $C_a$. Thus, $p_{i(b[i,a])}$ and $p_{a0}$ with $p_{i(b[i,a])} = p_{a0}$ are used to model the BM. Then, Step b[i,a] for $C_i$ is modeled by $\{p_{i(b[i,a])}, q_{i(b[i,a])}, z_{i(b[i,a])}, d_{i(b[i,a])}, t_{i(b[i,a])}, u_{i(b[i,a])}\}$ and Step 0 for $C_a$ by $\{p_{a0}, q_{a0}, z_{a0}, d_{a0}, t_{a0}, u_{a0}\}$, respectively. Thereafter, when we refer to Step b[i,a] in $C_i$, we use $p_{i(b[i,a])}$, whereas for Step 0 in $C_a$ we use $p_{a0}$. It should be pointed out that Step 0 in $C_1$ (the LLs) is not shared with any other tool and there is no outgoing buffer in a leaf tool $C_L$. The PN model for the BM linking $C_i$ and $C_a$ is shown in FIG. 3.

With the PN structure developed, marking $M_0$ is set as follows. To describe the idle state of the system, a special type of token called V-token representing a virtual wafer is introduced. As mentioned above, there is a process-bound bottleneck tool in the system. Hence, in the steady state, if there is a wafer being processed in every $PM_{ij}$ with $j\neq 0$, the system reaches its maximal throughput. Let $\chi$ denote the index set of non-leaf tools $N_K=\chi\cup\Psi$ with $\chi\cap\Psi=\emptyset$. Then, $M_0$ is set as follows. For $C_i$, $i\in N_K$, set $M_0(p_{ij})=1$ for $j\neq 1$ with a V-token, $M_0(p_{ij})=0$, $j=1$, and $M_0(p_{10})=n$; $M_0(q_{ij})=M_0(z_{ij})=M_0(d_{ij})=0$ for any $j$; and $M_0(r_i)=1$. It is assumed that the token in $p_{i(b[i,a])}$ enables $u_{a0}$, where $a\in DI(C_i)$.

It is easy to show that the obtained PN is deadlock-prone. To make it deadlock-free, let $\Omega_n=N_n\cup\{0\}$, a control policy on $y_{ij}$'s is defined as follows.

Definition 1: At marking M, $y_{ij}$, $i\in N_K$ and $j\in\Omega_{n[i]-1}$, is said to be control-enabled if $M(p_{i(j+1)})=0$; $y_{1(n[i])}$ is control-enabled if $M(p_{1(n[i])})=1$; and $y_{i(n[i])}$, $i\in N_K\backslash\{1\}$, is control-enabled if $M(p_{i0})=0$.

With Definition 1, the PN for an individual tool is shown to be deadlock-free [Wu et al., 2008a]. Thereafter, it is assumed that the PN is controlled by the policy given in Definition 1.

In the PN model for a BM shared by $C_i$ and $C_a$ shown in FIG. 3, $p_{i(b[i,a])}$ ($p_{a0}$) has two output transitions $u_{i(b[i,a])}$ and $u_{a0}$, leading to a conflict. A token entering $p_{i(b[i,a])}$ by firing $t_{i(b[i,a])}$ in $C_i$ should enable $u_{a0}$ in $C_a$, while a token entering $p_{a0}$ by firing $t_{a0}$ in $C_a$ should enable $u_{i(b[i,a])}$ in $C_i$. Colors are introduced to make the model conflict-free as follows.

Definition 2: Define the unique color of transition $t_i$ as $C(t_i)=\{c_i\}$.

By Definition 2, the colors for $u_{i(b[i,a])}$ and $u_{a0}$ are $c_{i(b[i,a])}$ and $c_{a0}$, respectively. Then, the color for a token in $p_{i(b[i,a])}$ or $p_{a0}$ is defined as follows.

Definition 3: For $i\in\chi$, $a\in DI(C_i)$, a token entering $p_{i(b[i,a])}$ by firing $t_{i(b[i,a])}$ in $C_i$ has color $c_{a0}$, while a token entering $p_{a0}$ by firing $t_{a0}$ in $C_a$ has color $c_{i(b[i,a])}$.

It is easy to check that, by Definitions 2 and 3, the model is conflict-free. The obtained model can also describe the behavior of initial and final transient processes as explained as follows. At $M_0$, $y_{i0}$ is enabled and fires leading to $M_1(q_{i0})=1$. By starting from $M_1$, transition $u_{10}$ fires and $W_1$ representing the first wafer is unloaded from $p_{10}$. In this way, every time when $u_{10}$ fires, a token for a real wafer is delivered into $p_{11}$. With the transition enabling and firing rules, the model evolves to reach a marking M such that every V-token is removed from the model and is replaced by a token for a real wafer, or a steady state is reached. The evolution from $M_0$ to M presents the initial transient process. Similarly, when the system needs to stop working, every time when $u_{10}$ fires, a V-token is delivered into $p_{11}$, the model can evolve back to marking $M_0$, which describes the final transient process.

A.4. Modeling Activity Time

To describe the temporal aspect, time is associated with both transitions and places. It follows from Kim et al. [2003] and Lee and Lee [2006] that the time for the robot to move from one step to another is a constant, and so is the time for the robot to load/unload a wafer into/from a PM. The symbols and time durations for places and transitions are listed in TABLE 1.

TABLE 1

The time durations associated with transitions and places ($i\in N_n$, $j\in\Omega_{n[i]}$).

| Symbol | Transition or place | Actions | Time required |
|---|---|---|---|
| $\lambda_i$ | $u_{ij}\in T$ | Robot $R_i$ unloads a wafer from $p_{ij}$ | Constant $\lambda_i$ |
|  | $t_{ij}\in T$ | Robot $R_i$ loads a wafer into $p_{ij}$ |  |
| $\mu_i$ | $y_{ij}\in T$ | Robot $R_i$ moves from a step to another | Constant $\mu_i$ |
|  | $x_{ij}\in T$ |  |  |
| $\alpha_{ij}$ | $p_{ij}\in P$ | Wafer processing in $p_{ij}$ | Constant $\alpha_{ij}$ |
| $\tau_{ij}$ | $p_{ij}\in P$ | Wafter sojourn in $p_{ij}$ | $\tau_{ij}$ |
| $\omega_{ij}$ | $q_{ij}\in P$ | Robot $R_i$ waits before unloading a wafer from $p_{ij}$ | $[0, \infty)$ |
|  | $z_{ij}, d_{ij}\in P$ | No time is associated | 0 |

B. Properties Of Scheduling A K-Cluster Tool

This section recalls the properties of scheduling an individual tool in [Zhu et al., 2013]. For a process-dominant K-tree-cluster tool, since a backward strategy is optimal for each individual tool, with the PN model shown in FIG. 2, $R_i$'s cycle time is given by [Wu et al., 2008]

$$\psi_i=2(n[i]+1)(\lambda_i+\mu_i)+\Sigma_{j=0}^{n[i]}\omega_{ij}=\psi_{i1}+\psi_{i2}, i\in N_K, \quad (1)$$

where $\psi_{i1}=2(n[i]+1)(\lambda_i+\mu_i)$ is $R_i$'s task time and is a constant, and $\psi_{i2}=\Sigma_{j=0}^{n[i]}\omega_{ij}$ is the robot waiting time in a cycle.

With robot waiting as an event, the time taken for completing a wafer at Step j in $C_i$, $i\in N_K$, is given by [Wu et al., 2008]

$$\xi_{ij}=\alpha_{ij}+4\lambda_i+3\mu_i+\omega_{i(j-1)}, i\in N_K \text{ and } j\in N_{n[i]}, \quad (2)$$

and $$\xi_{i0}=4\lambda_i+3\mu_i+\omega_{i(n[i])}, i\in N_K. \quad (3)$$

Note that, since a BM has no processing function, we have $\alpha_{i0}=\alpha_{i(b[i,a])}=0$, $a\in DI(C_i)$. With $\alpha_{ij}$, $\lambda_i$, and $\mu_i$ being constants and $\omega_{ij}$'s being variable, if $\omega_{ij}$ is set to be zero, the shortest time taken for completing a wafer at Step j in $C_i$ is $$\eta_{ij}=\alpha_{ij}+4\lambda_i+3\mu_i, i\in N_K \text{ and } j\in\Omega_{n[i]}. \quad (4)$$

A cluster tool may be scheduled such that a wafer stays in $PM_{ij}$ for some time after its completion, or $\tau_{ij}\geq\alpha_{ij}$, where $\tau_{ij}$ is the wafer sojourn time in $PM_{ij}$. For Step $j\in\{0, b[i,a]\}$, $a\in DI(C_i)$, or a BM, the wafer unloaded from $PS_{ij}$ by the f-th firing of $u_{ij}$ is not the one that is loaded into $PS_{ij}$ by the f-th firing of $t_{ij}$. However, for scheduling purpose, we concern only the time needed for completing the tasks in accessing a BM but not if they are the same wafer. Hence, the virtual wafer sojourn time for Step $j\in\{0, b[i, a]\}$, $a\in DI(C_i)$, is introduced as follows. Let $\upsilon_1$ and $\upsilon_2$ be the end time point of the k-th firing of $t_{ij}$ and the start time point of the k-th firing of $u_{ij}$, respectively. The virtual wafer sojourn time is defined as $\tau_{ij}=\upsilon_2-\upsilon_1$. In this way, for all steps in $C_i$, $\tau_{ij}$ has the same meaning. Then, by replacing $\alpha_{ij}$ with $\tau_{ij}$ in (2) and (3), the cycle time at Step j in $C_i$ is given by $$\theta_{ij}=\tau_{ij}+4\lambda_i+3\mu_i+\omega_{i(j-1)}, i\in N_K \text{ and } j\in N_{n[i]}, \quad (5)$$

and $$\theta_{i0}=\tau_{i0}+4\lambda_i+3\mu_i+\omega_{i(n[i])}, i\in N_K. \quad (6)$$

Let $\Pi_i=\max\{\eta_{i0}, \eta_{i1}, \ldots, \eta_{i(n[i])}, \psi_{i1}\}$. If $\Pi_i=\psi_{i1}$, $C_i$ is transport-bound, otherwise it is process-bound. The manufacturing process in $C_i$ is a serial one and $C_i$ should be scheduled such that $$\Theta_i=\theta_{i0}=\theta_{i1}=\ldots=\theta_{i(n[i])} \text{ and } \tau_{ij}\geq\alpha_{ij}, i\in N_K \text{ and } j\in\Omega_{n[i]} \quad (7)$$

where $\Theta_i$ is the cycle time of $C_i$. To find a feasible schedule, $\Theta_i \geq \Pi_i$ must hold. Given $\Theta_i$ for $C_i$, $R_i$ should be scheduled such that $\psi_i = \Theta_i$. Thus, $\psi_{i2} = \Theta_i - \psi_{i1}$ is the $R_i$'s waiting time in a cycle, or the schedule is a function of $R_i$'s waiting time. This implies that a one-wafer cyclic schedule for a multi-cluster tool is determined by the robots' waiting time. The key here is how to determine the minimal $\Theta_i$'s.

Let $\Theta$ denote the cycle time of a K-tree-cluster tool and $\Theta_i$ the cycle time of $C_i$, $i \in N_K$. From [Zhu et al., 2013b], it can easily show that, to obtain a one-wafer cycle schedule for a K-tree-cluster tool, $\Theta_1 = \Theta_2 = \ldots = \Theta_K = \Theta$ should hold. Let $C_h$, $1 \leq h \leq K$, be the bottleneck tool in a K-tree-cluster tool and $\Pi_h$ be its FP. Then, $\Theta_1 = \Theta_2 = \ldots = \Theta_K = \Theta \geq \Pi_h$ must hold. Hence, to obtain a one-wafer cycle schedule for a K-tree-cluster tool, every individual tool should have the same cycle time and, at the same time, the multiple robots should be coordinated such that all the individual tools operate in a paced way.

Assume that $C_i$, $\forall i \in N_K$. It is scheduled to have a cycle time $\Theta$. Examine $C_i$ and $C_a$, $i \notin \Psi$ and $a \in DI(C_i)$. If the system is scheduled such that, every time after $R_i$ loads a wafer into $PS_{i(b[i, a])}$ by firing $t_{i(b[i, a])}$, $u_{a0}$ fires immediately to unload this wafer by $R_a$, then $C_i$ and $C_a$ can operate in a paced way. If a K-tree-cluster tool is scheduled such that, any pair of $C_i$ and $C_a$ can operate in such a way, a one-wafer cyclic schedule is obtained. We then examine how $C_i$ and $C_a$, $i \notin \Psi$ and $a \in DI(C_i)$, can be scheduled to operate in a paced way. Let $\phi_{i0}$ be the start time point for firing $u_{i0}$ in $C_i$. Between the firings of $u_{i0}$ and $t_{i(b[i, a])}$, the following transition firing sequence is executed: $\sigma_i = \langle$firing $u_{i0}$ (with time $\lambda_i) \to x_{i0}(\mu_i) \to t_{i1}(\lambda_i) \to y_{i(n[i])}(\mu_i) \to$ robot waiting in $q_{i(n[i])}(\omega_{i(n[i])}) \to u_{i(n[i])}(\lambda_i) \to x_{i(n[i])}(\mu_i) \to t_{i0}(\lambda_i) \to \ldots \to y_{i(b[i, a]-1)}(\mu_i) \to$ robot waiting in $q_{i(b[i, a]-1)}(\omega_{i(b[i, a]-1)}) \to u_{i(b[i, a]-1)}(\lambda_i) \to x_{i(b[i, a]-1)}(\mu_i) \to t_{i(b[i, a])}(\lambda_i)\rangle$. Given a schedule for $C_i$ by setting $\omega_{ij}$'s, the time taken by $\sigma_i$ is $\Delta_i = \{(n[i]+1)-(b[i, a]-2)\}(2\lambda_i + 2\mu_i) - \mu_i + \Sigma_{j=b[i,a]-1}^{n[i]} \omega_{ij}$, if $b[i, a] > 1$; and $\Delta_i = 2\lambda_i + \mu_i$, if $b[i, a] = 1$. Then, $u_{a0}$ starts to fire at $\phi_{a0} = \phi_{i0} + \Delta_i$, $i \notin \Psi$. In other words, to make $C_i$ and $C_a$ operate in a paced way with a cycle time $\Theta$, $u_{a0}$ should fire $\Delta_i$ time units later than the firing of $u_{i0}$.

With the PN model, the above requirement can be implemented by properly scheduling $C_i$ and $C_a$ as follows. At $M_0$ that is set as above discussed, $u_{10}$ fires and $W_1$ representing the first real wafer released into the system is unloaded from $p_{10}$. Then, for an $m \in DI(C_1)$, transition firing sequence $\sigma_1 = \langle$firing $u_{10}(\lambda_1) \to x_{10}(\mu_1) \to t_{11}(\lambda_1) \to y_{1(n[1])}(\mu_1) \to$ robot waiting in $q_{1(n[1])}(\omega_{1(n[1])}) \to u_{1(n[i])}(\lambda_1) \to x_{1(n[1])}(\mu_1) \to t_{10}(\lambda_1) \to \ldots \to y_{1(b[1, m]-1)}(\mu_1) \to$ robot waiting in $q_{1(b[1, m]-1)}(\omega_{1(b[1, m]-1)}) \to u_{1(b[1, m]-1)}(\lambda_1) \to x_{1(b[1, m]-1)}(\mu_1) \to t_{1(b[1, m])}(\lambda_1)\rangle$ is executed in $C_1$. By firing $t_{11}$, $W_1$ is loaded into $PS_{11}$. After firing $t_{1(b[1,m])}$, $u_{m0}$ is enabled and fires. The time taken by $\sigma_1$ is $\Delta_1 = \{(n[1]+1)-(b[1, m]-2)\}(2\lambda_1 + 2\mu_1) - \mu_1 + \Sigma_{j=b[1,m]-1}^{n[1]} \omega_{1j}$ such that $\phi_{m0} = \phi_{10} + \Delta_1$. Then, in $C_1$, $t_{1(b[1, m])}$ fires again after a cycle. Meanwhile, in $C_m$, a cycle is also completed. Since the cycle time is $\Theta$ for both $C_1$ and $C_m$, $u_{m0}$ fires again just after $t_{1(b[1, m])}$ fires. During this cycle, $W_2$ is released into the system.

By starting from the firing of $u_{m0}$, transition firing sequence $\sigma_m = \langle u_{m0}(\lambda_m) \to x_{m0}(\mu_m) \to t_{m1}(\lambda_m) \to y_{m(n[m])}(\mu_m) \to$ robot waiting in $q_{m(n[m])}(\omega_{m(n[m])}) \to u_{m(n[m])}(\lambda_m) \to x_{m(n[m])}(\mu_m) \to t_{m0}(\lambda_m) \to \ldots \to y_{m(b[m, d]-1)}(\mu_m) \to$ robot waiting in $q_{m(b[m, d]-1)}(\omega_{m(b[m, d]-1)}) \to u_{m(b[m, d]-1)}(\lambda_m) \to x_{m(b[m, d]-1)}(\mu_m) \to t_{m(b[m, d])}(\lambda_m)\rangle$ is executed in $C_m$, $d \in DI(C_m)$. After firing $t_{m(b[m, d])}$, $u_{d0}$ is enabled and fires. The time taken by $\sigma_m$ is $\Delta_m$ such that $\phi_{d0} = \phi_{m0} + \Delta_m$. This process can be performed for every pair of $C_m$ and $C_d$, $d \in DI(C_m)$, such that every tool in the system acts in a paced way. Notice that, after each cycle in $C_1$, a V-token is removed from the system. When all V-tokens are removed, the steady state is reached and the system operates according to the backward one-wafer cycle schedule.

Notice that, to perform the above process for $C_m$ and $C_d$, $d \in DI(C_m)$, it requires that: 1) when $R_m$ arrives at $p_{m(b[m, d])}$ for firing $u_{m(b[m, d])}$ ($t_{m(b[m, d])}$), there is a token in $p_{m(b[m,d])}$ ($p_{m(b[m, d])}$ is emptied); and 2) when $R_d$ arrives at $p_{d0}$ for firing $u_{d0}$ ($t_{d0}$), there is a token in $p_{d0}$ ($p_{d0}$ is emptied). To make these requirements satisfied, we have the following theorem.

Theorem 1: Given $\Theta \geq \Pi_h$ as cycle time for a process-dominant K-tree-cluster tool, a one-wafer cyclic schedule exists if and only if, for any pair of $C_i$ and $C_a$, $a \in DI(C_i)$, the following conditions are satisfied by determining $\omega_{ij}$'s and $\omega_{af}$'s:

$$\theta_{ij} = \theta_{af} = \Theta, \ j \in \Omega_{n[i]} \text{ and } f \in \Omega_{n[a]}, \tag{8}$$

$$\tau_{i(b[i, a])} \geq 4\lambda_a + 3\mu_a + \omega_{a(n[a])} \tag{9}$$

and $$\tau_{a0} \geq 4\lambda_i + 3\mu_i + \omega_{i(b[i, a]-1)}. \tag{10}$$

The proof of Theorem 1 is similar to that in [Zhu et al., 2013b] and omitted. By Theorem 1, to find a one-wafer cyclic schedule, the key is to determine $\Theta$ such that (8)-(10) are satisfied by setting $\omega_{ij}$'s and $\omega_{af}$'s. This issue is discussed next.

C. One-Wafer Cyclic Scheduling

C.1. Scheduling of a Cluster-tool-chain

By viewing an individual tool as a vertex, the topology of a K-tree-cluster tool is a tree (directed graph) [Cormen et al., 2001]. Let $\chi(i, j)$ denote the index set of the tools on the path from $C_i$ to $C_j$, including i and j, and $|\chi(i, j)|$ be its cardinality. The length of the path from $C_i$ to $C_j$ is defined as the number of arcs connecting two adjacent tools on a path and is denoted by $\text{Len}(C_i, C_j) = |\chi_{(i, j)}| - 1$. If there is a path from $C_i$ to $C_j$ and $\text{Len}(C_1, C_i) < \text{Len}(C_1, C_j)$, $C_i$ is an upstream tool of $C_j$ and $C_j$ is a downstream one of $C_i$. Let $\text{O-Deg}(C_i)$ denote the number of downstream tools immediately adjacent to $C_i$. $C_i$ is called a fork tool if $\text{O-Deg}(C_i) \geq 2$. For example, in the 5-tree-cluster tool shown in FIG. 1, $\text{Len}(C_1, C_5) = 3$, O-Deg $(C_1) = 2$, and $\text{O-Deg}(C_3) = \text{O-Deg}(C_4) = 1$.

A multi-cluster tool with serial topology can be seen as a cluster-tool-chain (CTC). Then, a K-tree-cluster tool can also be seen to be formed by a number of CTCs. A CTC that starts from $C_f$ and ends at $C_l$ is denoted as CTC[f, l]. Note that a CTC can be formed by a single tool and in this case we have f=l. Let $UI(C_i)$ denote the index of the immediate upstream tool of $C_i$. Since $C_1$ has no upstream tool, we set $UI(C_1) = 0$. Then, we divide a K-tree-cluster tool into a number of CTCs such that, for a CTC[f, l], we have $\text{O-Deg}(C_j) \geq 2$, $j = UI(C_f)$ and $f \neq 1$; either $\text{O-Deg}(C_l) \geq 2$ or $\text{O-Deg}(C_l) = 0$; and $\text{O-Deg}(C_i) = 1$, $i \in \chi_{(i, j)}$, $i \neq f$, and $i \neq l$. For a K-tree-cluster tool, the individual tools can be labeled such that the tools on each CTC[f, l] are labeled with consecutive numbers in an increasing order from f to l. That is, the immediate upstream and downstream tools of $C_i$ are $C_{i-1}$ and $C_{i+1}$, respectively. For example, the 5-tree-cluster tool shown in FIG. 1 has three CTCs: $\{C_2\}$, $\{C_3, C_4, C_5\}$, and $\{C_1\}$. Algorithm 2 is presented later to find such CTCs. Before presenting the method for scheduling a K-tree-cluster tool, we discuss how to schedule the CTCs first.

Given CTC[f, l], there is only one BM shared by $C_i$ and $C_{i+1}$, $i \in N_{[f, l-1]} = \{f, f+1, \ldots, l-1\}$. Hence, for the simplicity of presentation, for a CTC, we can use $PS_{i(b[i])}$ for the BM in $C_i$ instead of $PS_{i(b[i,i+1])}$. Let $\varphi_{i(b[i])}=4\lambda_i+3\mu_i+\omega_{i(b[i]-1)}$ and $\varphi_{i0}=4\lambda_i+3\mu_i+\omega_{i(n[i])}$. Examining the conditions given in Theorem 1, one can find that, to schedule CTC[f, 1] from $C_l$ to $C_f$ such that these conditions are satisfied, one needs to set the robots' waiting time such that: 1) $\omega_{i(n[i])}$ is as small as possible; and 2) $\omega_{i(n[i])}$ and $\omega_{i(b[i]-1)}$, $i\in N_{[f, l-1]}$, are as small as possible. Given cycle time $\Theta \geq \Pi_h$, this can be implemented as follows: (1) set $\omega_{ij}=\min\{\Theta-(4\lambda_i+3\mu_i+\alpha_{i(j+1)}), \Theta-2(n[l]+1)(\lambda_i+\mu_i)-\Sigma_{m\in\Omega_j\setminus\{j\}}\omega_{lm}\}$; $j\in\Omega_{n[l]-1}$; (2) $\omega_{i(n[l])}=\Theta-2(n[l]+1)(\lambda_i+\mu_i)-\Sigma_{m=0}^{n[l]-1}\omega_{lm}$; (3) $\tau_{l0}=\Theta=\varphi_{l0}$; and (4) set $\omega_{ij}$'s from $i=l-1$ to f according to $$\omega_{i(b[i]-1)}=\min\{\tau_{(i+1)0}-(4\lambda_i+3\mu_i), \Theta-2(n[i]+1)(\lambda_i+\mu_i)\}, \quad (11)$$

$$\omega_{ij}=\min\{\Theta-(4\lambda_i+3\mu_i+\alpha_{i(j+1)}), \Theta_0-2(n[i]+1)(\lambda_i+\mu_i)-\Sigma_{m\in\Omega_j\setminus\{j\}}\omega_{im}\} \text{ for } j\in\Omega_{n[i]-1}\setminus\{b[i]-1, n[i]\}, \quad (12)$$

$$\omega_{i(n[i])}=\Theta-2(n[i]+1)(\lambda_i+\mu_i)-\Sigma_{m=0}^{n[i]-1}\omega_{im} \quad (13)$$

and $$\tau_{i0}=\Theta-\varphi_{i0}. \quad (14)$$

If $\forall i\in N_{[f, l-1]}$, $\omega_{i(b[i]-1)}\geq 0$, the conditions given in Theorem 1 are satisfied. That is, given $\Theta\geq\Pi_h$, a one-wafer cyclic schedule is found for CTC[f, 1] by setting the $\omega_{ij}$'s. However, $i\in N_{[f, l-1]}$, $\omega_{i(b[i]-1)}<0$ may happen. Since $\Theta-2(n[i]+1)(\lambda_i+\mu_i)\geq 0$ always holds. $\omega_{i(b[i]-1)}<0$ implies that $\tau_{(i+1)0}-(4\lambda_i+3\mu_i)<0$, leading to $\tau_{(i+1)0}<(4\lambda_i+3\mu_i)$, i.e., the conditions in Theorem 1 are violated. Thus, the above procedure can be used to not only schedule a CTC if a feasible one-wafer schedule exists for the given cycle time $\Theta$, it also can be used to check the existence of a one-wafer cyclic schedule for CTC[f, 1] and this procedure is called CTC-Check.

Note that, in the above procedure, for $i\in N_{[f, l-1]}$, $\psi_{i2}$ is assigned $\omega_{ij}$'s, $j\in\Omega_{n[i]-1}\}$ as much as possible. In this way, $\omega_{i(n[i])}$ and $\varphi_{i0}=4\lambda_i+3\mu_i+\omega_{i(n[i])}$ are minimized.

C.2. Minimal Cycle Time of a CTC

Given $\Theta\geq\Pi_h$ for CTC[f, 1], if $\omega_{i(b[i]-1)}<0$, $i\in N_{[f, l-1]}$, happens by using CTC-Check, one cannot find a one-wafer schedule with cycle time $\Theta$. However, a one-wafer cyclic schedule still exists and such a schedule can be found by increasing $\Theta$. The key is how to determine the minimal cycle time $\Theta$ and this issue is discussed as follows.

For CTC[f, 1] and given $\Theta$, $\tau_{(k+1)0}<(4\lambda_k+3\mu_k)$, $k\in N_{[f, l-1]}$, we assume that $\tau_{(i+1)0}\geq(4\lambda_i+3\mu_i)$, $i\in N_{[k+1, l-1]}$, that is, the conditions given in Theorem 1 are satisfied for $C_i$, $\forall i\in N_{[k+1, l-1]}$, but not satisfied for $C_k$. Since $4\lambda_k+3\mu_k$ is a constant, to make $\tau_{(k+1)0}\geq(4\lambda_k+3\mu_k)$ satisfied, the only way is to increase $\tau_{(k+1)0}$. Since $\tau_{(k+1)0}=\Theta-(4\lambda_{k+1}+3\mu_{k+1}+\omega_{(k+1)(n[k+1])})$ and $(4\lambda_{k+1}+3\mu_{k+1})$ is a constant, to increase $\tau_{(k+1)0}$, one needs to increase $\Theta$ and reduce $\omega_{(k+1)(n[k+1])}$. By examining the CTC-Check procedure, one can find that, by increasing $\Theta$, one can assign more part of $\psi_{(k+1)2}$ into $\omega_{(k+1)j}$, $j\in\Omega_{n[k+1]-1}\setminus\{n[k+1]\}$, such that $\omega_{(k+1)(n[k+1])}$ is reduced. In this way, $\tau_{(k+1)0}$ can be increased by increasing $\Theta$ and reducing $\omega_{(k+1)(n[k+1])}$ simultaneously.

By increasing $\Theta$, to obtain a one-wafer cyclic schedule, the cycle time for any $C_i$ in a K-tree-cluster tool should be increased as well such that every tool has the same cycle time. Hence, by increasing $\Theta$ for $C_i$, $i\in N_{[k+2, l]}$, $\omega_{i(n[i])}$ is reduced. Then, by the CTC-Check procedure, this leads to the decrease of $\omega_{(i-1)(n[i-1])}$. Finally, the increase of $\Theta$ for $C_i$, $i\in N_{[k+2, l-1]}$, can result in the decrease of $\omega_{(k+1)(n[k+1])}$. This implies that, with the increase of $\Theta$, $\omega_{(k+1)(n[k+1])}$ can be reduced by scheduling $C_{k+1}$ and its downstream tools. However, given $\Theta$, if CTC[f, 1] is scheduled by the CTC-Check procedure such that $\omega_{i(n[i])}=0$, $i\in N_{[k+2, l]}$, the increase of $\Theta$ for $C_i$ and its downstream tools has no effect on $\omega_{(k+1)(n[k+1])}$, since $\omega_{i(n[i])}$ cannot be reduced any more. Thus, the effect of scheduling downstream tools on $\omega_{(k+1)(n[k+1])}$ should be taken into account in finding the minimal cycle time.

Note that $C_l$ is either a leaf or a fork. If it is a fork, it has multiple outgoing BMs. This means that CTC[f, 1] has multiple downstream CTCs. As above discussed, with the increase of $\Theta$, scheduling tool $C_i$ in a downstream CTC of CTC[f, 1] can result in the reduction of $\omega_{(k+1)(n[k+1])}$. Also, given $\Theta$, if a schedule for tool $C_i$ in a downstream CTC is obtained by the CTC-Check procedure such that $\omega_{i(n[i])}=0$, then, with the increase of $\Theta$, scheduling $C_i$ and its downstream tools has no effect on $\omega_{(k+1)(n[k+1])}$.

With the above discussion, we present how to find the minimal cycle time and schedule the system as follows. Given $\Theta$, for CTC[f, 1], every time if $\omega_{k(b[k]-1)}<0$, $k\in N_{[f, l-1]}$ is returned by the CTC-Check procedure, the cycle time is increased by $\Delta$, i.e. $\Theta\leftarrow\Theta+\Delta$, such that $\tau_{(k+1)0}=(4\lambda_k+3\mu_k)$. The key is how to determine $\Delta$. To do so, define $D[i]=\{PM_{ij}|j\in\Omega_{n[i]-1}\setminus\{b[i]-1, n[i]\}\}$ be the set of steps in $C_i$ and $B[i]=|D[i]|$, and $B^*[i]=B[i]$ if $i\neq l$, and $B^*[l]=n[l]-1$.

Given $\Theta$, for CTC[f, 1], when $\omega_{k(b[k]-1)}<0$, $k\in N_{[f, l-1]}$, is returned by the CTC-Check procedure, for every $C_i$, $i\in N_{[k, l]}$, or in the downstream CTCs of CTC[f, 1], the robot waiting time is set by the CTC-Check procedure. To find $\Delta$, for $C_i$, $i\in N_{[k, l]}$, or in the downstream CTCs of CTC[f, 1], let $A_{ij}=\omega_{ij}$ and $\Lambda_{ij}=\tau_{ij}$, $j\in\Omega_{n[i]}$, and $\Phi=4\lambda_k+3\mu_k-\Lambda_{(k+1)0}=4\lambda_k+3\mu_k-(\Theta-(4\lambda_{k+1}+3\mu_{k+1}+\omega_{(k+1)(n[k+1])}))=4\lambda_k+3\mu_k+4\lambda_{k+1}+3\mu_{k+1}+\omega_{(k+1)(n[k+1])}-\Theta$.

To take the effect of tools in the downstream CTCs of CTC[f, 1] into account, we use $DsI(C_i)$, $i\notin\Psi$, to denote the index set of all the downstream tools of $C_i$ and LeafDsI($C_i$), the index set of leaf tools in $DsI(C_i)$. Further, define $E(k)=\{g\in\cup\chi_{(k, m)}|m\in LeafDsI(C_k), \omega_{j(n[j])}>0, j\in\cup\chi_{(h, g)}$ and $h=DI(C_k)$, and $\omega_{(g+1)(n[g+1])}=0$, $g\notin LeafDsI(C_k)\}$. Further, let $Y(k)=\{\cup\chi_{(h, s)}|s\in E(k)$ and $h=DI(C_k)\}$. Then, $\Delta$ is determined as follows. For $g\in Y(k)$, let $\delta_g=\omega_{g(n[g])}/\Sigma_{j\in Y(g)}B^*[j]$, $\delta_k=\Phi/(1+\Sigma_{j\in Y(k)}B^*[j])$, and $Q(k)=\{a\in\cup\chi_{(k, d)}|d\in E(k)\}$. Then, let $\Delta=\min_{h\in Q(k)}\delta_h$ and there are two cases.

Case 1: If $\Delta=\delta_k$, let $\Theta\leftarrow\Theta+\Delta$. For $\forall i\in DsI(C_a)$ and $\forall a\in E(k)$, set $\omega_{i0}=A_{i0}+\Delta$, $\tau_{i0}=\Lambda_{i0}+\Delta$, and $\tau_{i(m-1)}=\Lambda_{i(m-1)}+\Delta$ with $m\in BI(C_i)$, when $C_i$ is not a leaf tool. For $\forall i\in Y(k)\setminus E(k)$, $\omega_{ij}=A_{ij}+\Delta$, $j\in\Omega_{n[i]}\setminus\{\{j-1|j\in BI(C_i)\}\cup\{n[i]\}\}$, $\omega_{i(b[m, d]-1)}=A_{i(b[m, d]-1)}+\Delta\times\Sigma_{j\in\{\cup\chi_{(d,a)}|a\in E(i)\}}B^*[j]+\Delta$, $m\in BI(C_i)$ and $d=DI(C_i)$; $\omega_{i(n[i])}=A_{i(n[i])}-\Delta\times\Sigma_{j\in\{\cup\chi_{(i,a)}|a\in E(i)\}}B^*[j]$; and $\tau_{i0}=\Lambda_{i0}+\Delta+\Delta\times\Sigma_{j\in\{\cup\chi_{(i,a)}|a\in E(i)\}}B^*[j]$. Then, with the increased $\Theta$ and the reset $\omega_{ij}$'s, it is easy to verify that Conditions (9)-(10) are satisfied for $i\in DsI(C_k)$.

Case 2: If $\Delta\neq\delta_k$, let $\Delta=\delta_g=\min_{h\in Q(k)}\delta_h$, $\Theta\leftarrow\Theta+\Delta$. Then, for $\forall s\in E(k)$ and $\forall i\in DsI(C_s)$, $\omega_{i0}=A_{i0}+\Delta$, $\tau_{i0}=\Lambda_{i0}+\Delta$, and $\tau_{i(m-1)}=\Lambda_{i(m-1)}+\Delta$, $m\in BI(C_i)$, when $C_i$ is not a leaf tool. For $\forall i\in Y(k)$, $\omega_{ij}=A_{ij}+\Delta$, $j\in\Omega_{n[i]}\setminus\{\{j-1|j\in BI(C_i)\}\cup\{n[i]\}\}$, $\omega_{i(m-1)}=A_{i(m-1)}+\Delta\times\Sigma_{j\in Y(i)}B^*[j]+\Delta$, $m\in BI(C_i)$; $\omega_{i(n[i])}=A_{i(n[i])}-\Delta\times\Sigma_{j\in\{\cup\chi_{(i,a)}|a\in E(i)\}}B^*[j]$; and $\tau_{i0}=\Lambda_{i0}+\Delta+\Delta\times\Sigma_{j\in\{\cup\chi_{(i,a)}|a\in E(i)\}}B^*[j]$. By doing so, it follows from (5)-(6) that Conditions (9)-(10) are satisfied for $i\in DsI(C_k)$. Due to $\delta_k>\Delta=\delta_g$, we may have $\tau_{(k+1)0}<(4\lambda_k+3\mu_k)$ and $A_{g(n[g])}=0$, $g\in\cup\chi_{(k+1, a)}$, $a\in E(k)$. In this case, let $\Theta\leftarrow\Theta+\Delta$. Then, repeat the above procedure for $\chi_{(k+1, g-1)}$ until Case 1 occurs such that $\Delta=\delta_k$ or $A_{(k+1)(n[k+1])}=0$.

Finally the cycle time is increased by $\Delta$ such that $\tau_{(k+1)0}=(4\lambda_k+3\mu_k)$ and Conditions (9)-(10) for any pair of $C_i$ and $C_{i+1}$, $i\in N_{[f, l]}$, are satisfied. In addition, since $\tau_{(k+1)0}=(4\lambda_k+3\mu_k)$, a cycle time increase that is less than $\Delta$ must result in $\tau_{(k+1)0}<(4\lambda_k+3\mu_k)$. For a CTC without downstream CTCs, a method is presented to find the minimal cycle time and its optimal one-wafer cyclic schedule in [Zhu et al., 2013b]. Since such method is somehow similar to the one disclosed herein, we do not go into too much detail and please refer to [Zhu et al., 2013b] for detail.

In the above development, each individual tool is scheduled such that, for any $C_i$, $\omega_{i(n[i])}$ is minimized. Thus, it follows from $\Theta_1=\Theta_2=\ldots=\Theta_K=\Theta$ that $\varphi_{i0}$, $i\in N_{[f,\ l]}$, in CTC[f,l] is minimized. The above development is summarized as Algorithm 1, where inputs $\varphi$ and $\Theta\geq\Pi_h$ represent the index set of the individual cluster tools in a CTC and the given cycle time, respectively. Assume that all $\alpha_{ij}$, $\lambda_i$, $\mu_i$ of the K-cluster tool are known constants to Algorithm 1. Its output $\Theta$ is the CTC's minimal cycle time.

---

Algorithm 1: Scheduling CTC[f, l] for given $\Theta$ denoted as SCH(CTC[f, l], $\Theta$)

---

Input: $\Theta$, $N_{[f,\ l]}$.
Output: $\omega_{ij}$ for $C_i$, $i\in N_{[f,\ l]}$ and in the downstream CTCs, $j\in\Omega_{n[i]}$, $\varphi_{f0}$, $\Theta$, $\varepsilon$.
1. Initialization:
   1.1. $\tilde{N}\leftarrow l-f+1$, AD $\leftarrow$ Y $\leftarrow$ UI(f)
2. Set $\omega_{ij}$, $j\in\Omega_{n[l]}$ for $R_l$ as:
   2.1. For j$\leftarrow$ 0 to n[l] $-$ 1 do
   2.2. $\omega_{ij}\leftarrow$ min$\{\Theta- (4\lambda_l +3\mu_l+\alpha_{l(j+1)}),\Theta- 2(n[l] + 1)(\lambda_l + \mu_l) - \Sigma_{m=0}^{j-1}\ \omega_{lm}\}$
   2.3. EndFor
   2.4. $\omega_{l(n[l])} \leftarrow \Theta - 2(n[l] + 1)(\lambda_l + \mu_l) - \Sigma_{m=0}^{n[l]-1}\ \omega_{lm}$
   2.5. $\tau_{l0} \leftarrow \Theta - (4\lambda_l+ 3\mu_l+ \omega_{l(n[l])})$, i$\leftarrow$l $-$ 1, a$\leftarrow\tilde{N}-$ 1
3. If AD = 1 Then update $\omega_{mj}$(m$\in$ DsI($C_i$)) as
   3.1. For each j$\in$E$_0$
   3.2. $\omega_{j0} \leftarrow\omega_{j0} + \Delta$, $\tau_{j0}\leftarrow\tau_{j0} + \Delta$
   3.3. $\tau_{j(m-1)}\leftarrow\tau_{j(m-1)} + \Delta$, for m$\in$BI($C_j$)
   3.4. EndFor
   3.5. If E(i)$\neq\emptyset$ Then
   3.6. For each j$\in\cup\chi_{(i+1,\ g)}$|g$\in$E(i) do
   3.7. $\omega_{jm}\leftarrow\omega_{jm} + \Delta$, for m$\in\Omega_{n[j]} \setminus (\{i-1|j\in BI(C_i)\}\cup\{n[j]\})$
   3.8. $\beta\leftarrow \Sigma_{m\in Y(j)}$ B*[m]
   3.9. $\omega_{j(m-1)} \leftarrow\omega_{j(m-1)}+ \Delta\times\beta+ \Delta$, for m$\in$BI($C_j$)
   3.10. $\omega_{j(n[j])} \leftarrow\omega_{j(n[j])} - \Delta\times\beta$
   3.11. $\tau_{j0} \leftarrow\Sigma_{j0}+\Delta + \Delta\times\beta$
   3.12. EndFor
   3.13. EndIf
   3.14. a$\leftarrow |\chi_{(f,i)}|$
4. Set $\omega_{ij}$ for $R_i$ (i$\in\chi_{(f,\ l-i)}$, j$\in\Omega_{n[i]}$) as:
   4.1. While a$\geq$1
   4.2. If$\tau_{(i+1)0}<(4\lambda_i + 3\mu_i)$ Then
   4.3. $\Phi\leftarrow 4\lambda_i + 3\mu_i - \tau_{(i+1)0}$
   4.4. If $\omega_{(i+1)(n[i+1])}= 0$ Then $\Delta \leftarrow \Phi$, E(i)$\leftarrow\emptyset$, E$_0\leftarrow$DsI($C_i$)
   4.5. Else
   4.6. Find E(i)
   4.7. $\delta_k \leftarrow \omega_{k(n[k])}/ \Sigma_{m\in Y(k)}$ B*[m], for each k$\in$Y(i)
   4.8. $\delta_i\leftarrow\Phi/(1 + \Sigma_{m\in Y(i)}$ B*[m])
   4.9. $\Delta\leftarrow$min$\{\delta_i, \delta_k\}$with k$\in$Y(i)
   4.10. E$_0\leftarrow\cup$DsI($C_g$)| g $\in$E(i)
   4.11. EndIf
   4.12. $\Theta\leftarrow\Theta+ \Delta$
   4.13. AD $\leftarrow 1$
   4.14. Goto 3.
   4.15. EndIf
   4.16. $\omega_{i(b[i]-1)}\leftarrow$ min$\{\tau_{(i+1)0}- (4\lambda_i + 3\mu_i),\Theta -2(n[i] + 1)(\lambda_i +\mu_i)\}$
   4.17. For j$\leftarrow$ 0 to n[i] and j$\neq$b[i] $-1$ do
   4.18. $\omega_{ij}\leftarrow$ min$\{\Theta- (4\lambda_i +3\mu_i+\alpha_{i(j+1)}),\Theta- 2(n[i] + 1)(\lambda_i + \mu_i) - \Sigma_{m\in\Omega_j\setminus\{j\}}\ \omega_{im}\}$
   4.19. EndFor
   4.20. $\tau_{i0}\leftarrow\Theta- (4\lambda_i+ 3\mu_i + \omega_{i(n[i])})$, i$\leftarrow$ i$-$ 1, a $\leftarrow$a$-$ 1
   4.21. EndWhile.
5. Set $\varphi_{f0}$ and $\Theta_i$ as:
   5.1. If Y$\neq$ 0 and $4\lambda_r + 3\mu_r >\tau_{f0}$ Then
   5.2. $\leftarrow 4\lambda_r + 3\mu_r -\tau_{f0}$
   5.3. If $\omega_{f(n[f])}= 0$ Then $\Delta\leftarrow\Phi$, E(i)$\leftarrow\emptyset$, E$_0\leftarrow$DsI($C_i$)
   5.4. Else
   5.5. Find E(f)
   5.6. $\delta_k \leftarrow \omega_{k(n[k])}/\ \Sigma_{m\in Y(k)}$ B*[m], for each k$\in$Y(f)
   5.7. $\delta_f\leftarrow\Phi/(1+ \Sigma_{m\in Y(f)}$ B*[m])
   5.8. $\Delta\leftarrow$min$\{\delta_f, \delta_k\}$with k$\in$Y(f)
   5.9. E$_0\leftarrow\cup$DsI($C_f$)|f$\in$E(f)
   5.10. EndIf
   5.11. $\Theta\leftarrow\Theta+ \Delta$, Adjusting$\leftarrow 1$
   5.12. GoTo 3
   5.13. EndIf
   5.14. $\varepsilon \leftarrow \Theta -\Theta_0$
   5.15. $\varphi_{f0} \leftarrow 4\lambda_f+ 3\mu_f+ \omega_{f(n[f])}$
6. End C.3. Scheduling K-Tree-Cluster Tool As above discussed, a K-tree-cluster tool is composed of a number of CTCs, to obtain the minimal cycle time of the K-tree-cluster tool, it needs to minimize $\varphi_{i0}=4\lambda_i+3\mu_i+\omega_{i(n[i])}$ for every $C_i$ in each CTC, or minimize $\omega_{i(n[i])}$. This is done as follows. Let L-CTC be the set of CTC[f, l]s with $C_l$ being a leaf tool of the K-tree-cluster tool and assume that |L-CTC|=g. Given $\Theta=\Pi_h$, the lower bound of cycle time for a K-tree-cluster tool, as the initial cycle time, each CTC in the L-CTC is scheduled by using Algorithm 1. Assume that the minimal cycle time obtained for these g CTCs are $\Theta_1, \ldots, \Theta_g$, respectively. Then, given $\Theta=\max\{\Theta_1, \ldots, \Theta_g\}$ as the cycle time, for any $C_i$ in any CTC that is in L-CTC, $\omega_{ij}$'s are set by the CTC-Check procedure. After that, given $\Theta=\max\{\Theta_1, \ldots, \Theta_g\}$ as initial cycle time, we schedule the CTC$\not\in$L-CTC that is not scheduled and whose downstream CTCs are all in L-CTC. By repeating such a process, one can find a one-wafer cyclic schedule for the entire K-tree-cluster tool by minimizing $\varphi_{i0}=4\lambda_i+3\mu_i+\omega_{i(n[i])}$ for every individual tool $C_i$. If finally the obtained minimal cycle time is $\Theta=\Pi_h$, the lower bound of cycle time is reached by a one-wafer cyclic schedule. We present Algorithm 2 as follows to implement above sketchy procedure.

---
Algorithm 2: Schedule a K-tree-cluster tool.
---

Input: $\alpha_{ij}, \lambda_i, \mu_i$ ($i \in N_K, j \in \Omega_{n[i]}$)
Output: $\omega_{ij}, \Theta$
1. Initialization: $\Pi_h \leftarrow \max(\Pi_i)$, $i \in N_K$, $\Psi \leftarrow \emptyset$, $\Psi_1 \leftarrow \emptyset$
2. For each $i \in N_K$ do
3. If ($\forall j \in N_{n[i]}, \alpha_{ij} > 0$) Then $\Psi \leftarrow \Psi \cup \{i\}$ EndIf
4. EndFor
5. While $\Psi \neq \emptyset$
6. For each $e \in \Psi$ do
7. $\mathfrak{H} \leftarrow \{e\}$, $m \leftarrow UI(C_e)$
8. While $m \neq 0$ and O-Deg($C_m$) = 1 do $\mathfrak{H} \leftarrow \mathfrak{H} \cup \{m\}$, $m \leftarrow UI(C_m)$
   EndWhile
9. $f \leftarrow \min(\mathfrak{H})$
10. $i \leftarrow UI(C_f)$, $j \leftarrow$ the step index of $PM_{i(b[i,f])}$ in $C_i$
11. $\Psi_1 \leftarrow \Psi_1 \cup \{i\}$
12. $\Pi_{new} \leftarrow \max(\Pi_h, \max(\Pi_m)|m \in \mathfrak{H})$
13. Call SCH(CTC[f, l], $\Pi_{new}$) to set $\varphi_{i0}$, $\Theta$, $\varepsilon_{ij}$
14. $\alpha_{ij} \leftarrow \varphi_{i0}$
15. EndFor
16. $\Psi \leftarrow \emptyset$
17. For each $i \in \Psi_1$ do
18. If $\forall j \in BI(i)$, $\alpha_{ij} > 0$ Then
19. $\varepsilon \leftarrow \max(\varepsilon_{ij})$, $j \in BI(i)$, $\Psi_1 \leftarrow \Psi_1 \setminus \{i\}$, and $\Psi \leftarrow \Psi \cup \{i\}$
20. For $\forall j \in BI(i)$ and $\varepsilon_{ij} < \varepsilon$
21. $\omega_{m0} \leftarrow \omega_{m0} + (\varepsilon - \varepsilon_{ij})$, $\tau_{m0} \leftarrow \tau_{m0} + (\varepsilon - \varepsilon_{ij})$, $m \in DsI(C_j)$
22. EndFor
23. EndIf
24. EndFor
25. EndWhile

---

By Algorithm 2, the CTCs in a K-tree-cluster tool are identified and they are scheduled by calling Algorithm 1 to find the minimal cycle time and set the robots' waiting time. This is done from the leaves to the root in a backward way as above discussed. Also, by Algorithm 2, if $\Theta=\Pi_h$ is returned, it implies that $\tau_{(i+1)0}<(4\lambda_i+3\mu_i)$, $\forall i \in N_K$, does not occur and a one-wafer cyclic schedule with the lower bound of cycle time is obtained. Therefore, Algorithm 2 can be used to decide whether the K-tree-cluster tool can be scheduled to reach the lower bound of cycle time. Thus, we have Theorem 2 immediately.

Theorem 2: For a process-dominant K-tree-cluster tool, there is a one-wafer cyclic schedule such that its cycle time is the lower bound $\Pi_h$ if and only if, by Algorithm 2, $\Theta=\Pi_h$ is returned.

Moreover, by the proposed method, if $\Theta>\Pi_h$ is returned, the obtained one-wafer cyclic schedule is optimal as stated by the following theorem.

Theorem 3: For a process-dominant K-tree-cluster tool, by Algorithm 2, if $\Theta>\Pi_h$ is returned, the obtained one-wafer cyclic schedule is optimal in terms of cycle time.

Proof. By applying Algorithm 2 to a K-tree-cluster tool, every time if $\tau_{(i+1)0}<(4\lambda_i+3\mu_i)$, $i \in N_K$, occurs, the cycle time $\Theta$ is increased by $\Delta$ as $\Theta \leftarrow \Theta+\Delta$ such that $\tau_{(i+1)0}=(4\lambda_i+3\mu_i)$. Hence, by Algorithm 2, finally a one-wafer cyclic schedule is obtained with cycle time $\Theta>\Pi_h$, this implies that there is at least an $i \in N_K$ such that $\tau_{(i+1)0}=(4\lambda_i+3\mu_i)$. In this case, any decrease of $\Theta$ would result in $\tau_{(i+1)0}=(4\lambda_i+3\mu_i)$, leading to the violation of Conditions (9)-(10). Thus, $\Theta>\Pi_h$ obtained is the minimal cycle time.

Note that, for a process-dominant K-tree-cluster tool addressed in this work, each individual tool is scheduled by using a backward scheduling strategy. This implies that a backward scheduling strategy is optimal for such a K-tree-cluster tool if the proposed method is applied.

D. Illustrative Examples

In this section, we use two examples to show how to apply the proposed method and its effectiveness. In the examples, the time is in seconds and is omitted for simplicity.

Example 1

Figure 4:
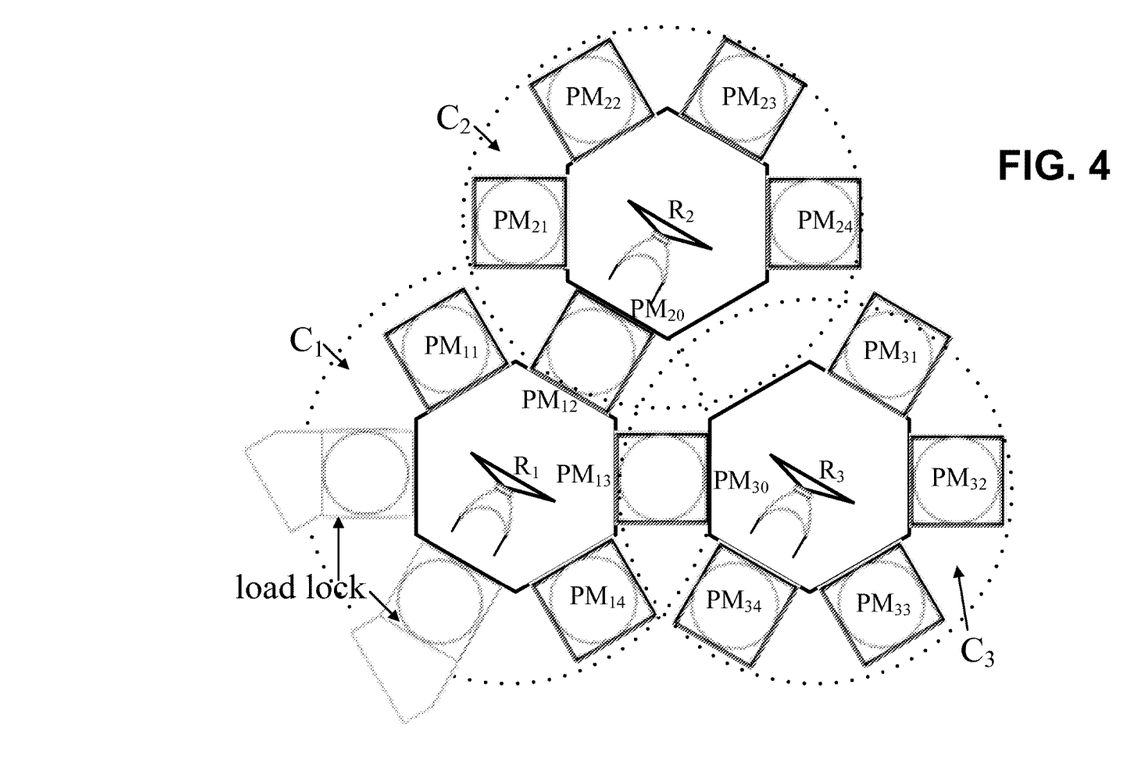
FIG. 4 shows a multi-cluster tool considered for analysis in Example 1.

It is from [Chan et al., 2011b]. As shown in FIG. 4, it is a 3-tree-cluster tool composed of three single-arm cluster tools, where $PS_{10}$ is the LLs, $PS_{20}$ and $PS_{30}$ are incoming buffers for $C_2$ and $C_3$, and, $PS_{12}$ and $PS_{13}$ are outgoing buffers for $C_1$. The activity time is as follows: for $C_1$, ($\alpha_{10}$, $\alpha_{11}, \alpha_{12}, \alpha_{13}, \alpha_{14}; \lambda_1, \mu_1$)=(0, 10, 0, 0, 10; 5, 2); for $C_2$, ($\alpha_{20}$, $\alpha_{21}, \alpha_{22}, \alpha_{23}, \alpha_{24}; \lambda_2, \mu_2$)=(0, 70, 70, 58, 5; 3, 1); and for $C_3$, ($\alpha_{30}, \alpha_{31}, \alpha_{32}, \alpha_{33}, \alpha_{34}; \lambda_3, \mu_3$)=(0, 5, 58, 70, 70; 3, 1). The wafer processing route is LL$\rightarrow$PS$_{11}$$\rightarrow$PS$_{12}$ (PS$_{20}$)$\rightarrow$PS$_{21}$$\rightarrow$PS$_{22}$$\rightarrow$PS$_{23}$$\rightarrow$PS$_{24}$$\rightarrow$PS$_{20}$ (PS$_{12}$)$\rightarrow$PS$_{13}$ (PS$_{30}$)$\rightarrow$PS$_{31}$$\rightarrow$PS$_{32}$$\rightarrow$PS$_{33}$$\rightarrow$PS$_{34}$$\rightarrow$PS$_{30}$ (PS$_{13}$)$\rightarrow$PS$_{14}$$\rightarrow$ LL. It contains three CTCs: CTC[2, 2], CTC[3, 3], and CTC[1, 1]. For this example, a multi-wafer cyclic schedule is obtained with cycle time 102.8 in [Chan et al., 2011b].

By $\eta_{ij}=\alpha_{ij}+4\lambda_i+3\mu_i$, $\psi_{i1}=2(n[i]+1)(\lambda_i+\mu_i)$, and $\Pi_i=\max\{\eta_{i0}, \eta_{i1}, \ldots, \eta_{i(n[i])}, \psi_{i1}\}$, for $C_1$, $\eta_{10}=\alpha_{10}+4\lambda_1+3\mu_1=0+4\times5+3\times2=26$, $\eta_{11}=36$, $\eta_{12}=26$, $\eta_{13}=26$, $\eta_{14}=36$, and $\psi_{11}=2(n[1]+1)(\mu_1+\lambda_1)=2\times(4+1)\times(5+2)=70$. We have $\Pi_1=70$ and $C_1$ is transport-bound. For $C_2$, we have that $\eta_{20}=15$, $\eta_{21}=85$, $\eta_{22}=85$, $\eta_{23}=73$, $\eta_{24}=20$, and $\psi_{21}=40$. Thus we have $\Pi_2=85$ and $C_2$ is process-bound. For $C_3$, we have that $\eta_{30}=15$, $\eta_{31}=20$, $\eta_{32}=73$, $\eta_{33}=85$, $\eta_{34}=85$, and $\psi_{31}=40$. Then we have $\Pi_3=85$ and $C_3$ is process-bound. Since $\Pi_2=\Pi_3>\Pi_1$, and $C_2$ and $C_3$ are process-bound, the 3-tree-cluster is process-dominant.

With the lower bound of cycle time being $\Pi_h=\Pi_2=\Pi_3=85$, set $\Theta=\Pi_h=85$ as initial cycle time, we have $\psi_{12}=\Theta-\psi_{11}=15$, $\psi_{22}=\Theta-\psi_{21}=40$, and $\psi_{32}=\Theta-\psi_{21}=40$. By Algorithm 2 that calls Algorithm 1, $\omega_{ij}$'s are set as $\omega_{20}=\omega_{21}=0$, $\omega_{22}=12$, $\omega_{23}=33$, $\omega_{24}=0$, $\omega_{30}=45$, $\omega_{31}=\omega_{32}=\omega_{33}=\omega_{34}=0$, $\omega_{10}=\omega_{11}=\omega_{12}=\omega_{13}=0$ and $\omega_{14}=15$ such that $\Theta=\Pi_h=85$ is returned. Hence, a one-wafer cyclic schedule with the lower bound of cycle time $\Theta=85$ is obtained, which verifies Theorem 2.

With this topology of this example, by changing the activity time, four other cases are generated and studied in [Chan et al., 2011b] by using the method proposed there. For each of these cases, a multi-wafer cyclic schedule is obtained. These cases are also studied by the proposed method and a one-wafer cyclic schedule is obtained for each of the cases with the cycle time being less than that obtained in [Chan et al., 2011b].

Example 2

It is a 5-tree-cluster tool composed of five single-arm cluster tools as shown in FIG. 1, where $PS_{10}$ is the LLs, $PS_{20}$, $PS_{30}$, $PS_{40}$, and $PS_{50}$ are incoming buffers for $C_2$, $C_3$, $C_4$, and $C_5$, $PS_{12}$ and $PS_{13}$ are outgoing buffers for $C_1$, and $PS_{32}$ and $PS_{42}$ are outgoing buffers for $C_3$ and $C_4$. The activity time is as: for $C_1$, $(\alpha_{10}, \alpha_{11}, \alpha_{12}, \alpha_{13}, \alpha_{14}; \lambda_1, \mu_1)=(0, 10, 0, 0, 10; 5, 2)$; for $C_2$, $(\alpha_{20}, \alpha_{21}, \alpha_{22}, \alpha_{23}, \alpha_{24}; \lambda_2, \mu_2)=(0, 70, 70, 58, 5; 3, 1)$; for $C_3$, $(\alpha_{30}, \alpha_{31}, \alpha_{32}, \alpha_{33}, \alpha_{34}; \lambda_3, \mu_3)=(0, 34, 0, 31, 4; 8, 1)$; for $C_4$, $(\alpha_{40}, \alpha_{41}, \alpha_{42}, \alpha_{43}, \alpha_{44}; \lambda_4, \mu_4)=(0, 100, 0, 100, 98; 1, 1)$; and for $C_5$, $(\alpha_{50}, \alpha_{51}, \alpha_{52}, \alpha_{53}, \alpha_{54}; \lambda_5, \mu_5)=(0, 100, 100, 100, 100; 1, 1)$. The wafer processing route is given in Section II. It contains three CTCs: CTC[3, 5], CTC[2, 2], and CTC[1, 1].

By $\eta_{ij}=\alpha_{ij}+4\lambda_i+3\mu_i$, $\psi_{i1}=2(n[i]+1)(\lambda_i+\mu_i)$, and $\Pi_i=\max\{\eta_{i0}, \eta_{i1}, \ldots, \eta_{i(n[i])}, \psi_{i1}\}$, for $C_1$, $\eta_{10}=\alpha_{10}+4\lambda_1+3\mu_1=0+4\times5+3\times2=26$, $\eta_{11}=36$, $\eta_{12}=26$, $\eta_{13}=26$, $\eta_{14}=36$, and $\psi_{11}=70$. We have $\Pi_1=70$ and $C_1$ is transport-bound. For $C_2$, we have that $\eta_{20}=15$, $\eta_{21}=85$, $\eta_{22}=85$, $\eta_{23}=73$, $\eta_{24}=20$, and $\psi_{21}=40$. Then we have $\Pi_2=85$ and $C_2$ is process-bound. For $C_3$, we have that $\eta_{30}=35$, $\eta_{31}=69s$, $\eta_{32}=35$, $\eta_{33}=66$, $\eta_{34}=39$, and $\psi_{31}=90$. Thus we have $\Pi_3=90$ and $C_3$ is transport-bound. For $C_4$, we get $\eta_{40}=7s$, $\eta_{41}=107$, $\eta_{42}=7s$, $\eta_{43}=107$, $\eta_{44}=105s$, and $\psi_{41}=20$. Therefore, we have $\Pi_4=107$ and $C_4$ is process-bound. For $C_5$, it is found that $\eta_{50}=7s$, $\eta_{51}=107$, $\eta_{52}=107$, $\eta_{53}=107$, $\eta_{54}=107$, and $\psi_{51}=20$. Hence we have $\Pi_5=107$ and $C_5$ is process-bound. Since $\Pi_4=\Pi_5 \geq \Pi_i$, $i \in N_3$, and $C_4$ and $C_5$ are process-bound, the 5-tree-cluster is process-dominant.

With the lower bound of cycle time being $\Pi_4=\Pi_5=107$, set $\Theta=107$ as initial cycle time. By $\psi_{i2}=\Theta-\psi_{i1}$, we have $\psi_{12}=37$, $\psi_{22}=67$, $\psi_{32}=17$, $\psi_{42}=87$, and $\psi_{52}=87$. By applying Algorithm 2 to CTC[3, 5], the cycle time is increased as $\Theta \leftarrow \Theta+\Delta \leftarrow \Theta+((4\lambda_3+3\mu_3)-\tau_{40})/(1+B^*[4]+B^*[5])=107+(35-21)/(1+3+3)=107+2=109$. Then, $\Theta=109$ is set for scheduling CTC[2, 2] and CTC[1, 1]. Then, given $\Theta=109$, by applying Algorithm 2 to CTC[2, 2] and CTC[1, 1] sequentially, the cycle time $\Theta=109$ is returned and $\omega_{ij}$'s are set as: $\omega_{30}=19$, $\omega_{31}=\omega_{32}=\omega_{33}=\omega_{34}=0$, $\omega_{40}=2$, $\omega_{41}=14$, $\omega_{42}=2$, $\omega_{43}=4$, $\omega_{44}=67$, $\omega_{50}=\omega_{51}=\omega_{52}=\omega_{53}=2$, $\omega_{54}=81$, $\omega_{10}=39$, $\omega_{11}=\omega_{12}=\omega_{13}=\omega_{14}=0$, $\omega_{20}=24$, $\omega_{21}=22$, $\omega_{22}=23$, $\omega_{23}=0$, and $\omega_{24}=0$. Hence, an optimal one-wafer cyclic schedule with cycle time $\Theta=109$ is obtained.

E. The Present Invention

The present invention is developed based on the theoretical development in Sections A-C above.

An aspect of the present invention is to provide a computer-implemented method for scheduling a tree-like multi-cluster tool to generate a one-wafer cyclic schedule. The multi-cluster tool comprises K single-cluster tools $C_i$'s. The multi-cluster tool is decomposable into a plurality of CTCs each having a serial topology.

Exemplarily, the method makes use of the finding given by Theorem 1. In particular, the method comprises determining values of $\omega_{ij}$, $i=1, 2, \ldots, K$, and $j=0, 1, \ldots, n[i]$, such that (8)-(10) are satisfied for any pair of $C_i$ and $C_a$, in which $i, a \in N_K$, $C_a$ being an immediate downstream tool of $C_i$.

In determining the aforesaid values of $\omega_{ij}$, preferably a CTC-Check algorithm for computing candidate values of $\omega_{ij}$ under a constraint on $\Theta$. The computation of the candidate $\omega_{ij}$ values is performed for at least one individual CTC. The CTC-Check algorithm for CTC[f, l] is configured to compute the candidate $\omega_{ij}$ values such that $\omega_{i(n[i])}$ is minimized for each value of i selected from $N_{[f, l-1]}$. In one embodiment, the CTC-Check algorithm as used in the disclosed method is the one given by Section C.1.

Based on the CTC-Check algorithm, the values of $\omega_{ij}$, $i=1, 2, \ldots, K$, and $j=0, 1, \ldots, n[i]$, are determined as follows according to one embodiment of the present invention. First, the candidate values of $\omega_{ij}$ for the single-cluster tools in an individual CTC are determined by performing the CTC-Check algorithm under the constraint that $\Theta$ is equal to a lower bound of cycle time of the multi-cluster tool. This lower bound is a FP of a bottleneck tool among the K single-cluster tools, and is given by $\Pi_h$. If the candidate $\omega_{ij}$ values for the individual CTC are non-negative, then the candidate $\omega_{ij}$ values are set as the determined values of $\omega_{ij}$ for the individual CTC. If at least one of the candidate $\omega_{ij}$ values for the individual CTC is negative, a minimum cycle time for the individual CTC is first determined and then the values of $\omega_{ij}$ for the individual CTC are determined by performing the CTC-Check algorithm under a revised constraint that $\Theta$ is the determined minimum cycle time for the individual CTC.

More particularly, it is preferable and advantageous that the values of $\omega_{ij}$, $i=1, 2, \ldots, K$, and $j=0, 1, \ldots, n[i]$, are determined according to the procedure given in Section C.3, where the procedure is embodied in Algorithms 1 and 2 detailed above. A summary of this procedure is given as follows. First identify an L-CTC set consisting of first individual CTCs each having a leaf tool therein. It follows that one or more second individual CTCs not in the L-CTC set are also identified. For each of the first individual CTCs, a minimum cycle time is determined, followed by determining the values of $\omega_{ij}$ by performing the CTC-Check algorithm under the constraint that $\Theta$ is equal to the determined minimum cycle time. For each second individual CTC, candidate values of $\omega_{ij}$ for each single-cluster tool therein are determined by performing the CTC-Check algorithm under an initial constraint that $\Theta$ is equal to a maximum value of the minimum cycle times already determined for the first individual CTCs. If the candidate $\omega_{ij}$ values for the second individual CTC are non-negative, then the candidate $\omega_{ij}$ values are set as the determined values of $\omega_{ij}$ for the second individual CTC. If, on the other hand, at least one of the candidate $\omega_{ij}$ values for the second individual CTC is negative, then the following two-step procedure is performed. First, determine a minimum cycle time for the second individual CTC. Second, determine the values of $\omega_{ij}$ for the second individual CTC by performing the CTC-Check algorithm under a revised constraint that $\Theta$ is equal to the determined minimum cycle time for the second individual CTC.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In particular, the method disclosed herein can be implemented in a tree-like multi-cluster cluster tool if the multicluster tool includes one or more processors. The one or more processors are configured to execute a process of generating a one-wafer cyclic schedule according to one of the embodiments of the disclosed method.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for controlling robots of a tree-like multi-cluster tool in wafer processing, the multi-cluster tool comprising K single-cluster tools denoted as $C_i$, i=1, 2, . . . , K, the single-cluster tool $C_i$ having a robot $R_i$ for wafer handling, the multi-cluster tool being decomposable into a plurality of cluster-tool-chains (CTCs) each having a serial topology, an individual CTC consisting of single-cluster tools $C_i$, $C_{i+1}$, . . . $C_{i'}$, being denoted as CTC[i, i'], processing steps performed by $C_i$ being indexed from 0 to n[i], a first processing step of $C_i$ having an index 0 and being a step of loading a wafer from a loadlock or a buffer module of $C_i$ to $R_i$, the method comprising:

determining values of $\omega_{ij}$, i=1, 2, . . . , K, and j=0, 1, . . . , n[i], wherein $\omega_{ij}$ is a robot waiting time for $R_i$ to wait at a j-th step in $C_i$ before unloading the wafer from a process module used for performing the j-th step in $C_i$;

for any i∈{1, 2, . . . , K} and any j∈{0, 1, . . . , n[i]}, when $R_i$ arrives at the process module for the j-th step for unloading the wafer therefrom in the j-th step performed in $C_i$, waiting, by $R_i$, for the robot waiting time of $\omega_{ij}$;

after the robot waiting time of $\omega_{ij}$ expires, unloading, by $R_i$, the wafer from the process module for the j-th step;

after the wafer is unloaded from the process module for the j-th step, transporting, by $R_i$, the wafer to the process module for a next step that is either a (j+1)th step, or a zeroth step when j=n[i]; and after the wafer arrives at the process module for the next step, loading, by $R_i$, the wafer to the second process module;

wherein the determining of $\omega_{ij}$, i=1, 2, . . . , K, and j=0, 1, . . . , n[i], comprises:

determining candidate values of $\omega_{ij}$ for the single-cluster tools in an individual CTC by performing a CTC-Check algorithm under a constraint that Θ is equal to a lower bound of cycle time of the multi-cluster tool, the lower bound of cycle time of the multi-cluster tool being a fundamental period of a bottleneck tool among the K single-cluster tools;

responsive to finding that the candidate $\omega_{ij}$ values for the individual CTC are non-negative, setting the candidate $\omega_{ij}$ values as the determined values of $\omega_{ij}$ for the individual CTC; and responsive to finding that at least one of the candidate $\omega_{ij}$ values for the individual CTC is negative, performing:
  determining a minimum cycle time for the individual CTC; and
  determining the values of $\omega_{ij}$ for the individual CTC as the candidate values of $\omega_{ij}$ obtained by performing the CTC-Check algorithm under a revised constraint that Θ the determined minimum cycle time for the individual CTC;

wherein the CTC-Check algorithm for CTC[f, l] is configured to compute the candidate values of $\omega_{ij}$ such that $\omega_{i(n[i])}$ is minimized for each value of i selected from $N_{[f, l-1]}$, and the CTC-Check algorithm comprises the steps of:

setting $\omega_{lj}$=min{Θ−(4$\lambda_l$+3$\mu_l$+$\alpha_{l(j+1)}$), Θ−2(n[l]+1)($\lambda_l$+$\mu_l$)−$\sum_{m\in\Omega_l\backslash\{j\}}\omega_{lm}$}, j∈$\Omega_{n[l]-1}$;

setting $\omega_{l(n[l])}$=Θ−2(n[l]+1)($\lambda_l$+$\mu_l$)−$\sum_{m=0}^{n[l]-1}\omega_{lm}$;

setting $\tau_{l0}$=Θ−$\varphi_{l0}$; and setting values of $\omega_{ij}$'s, i=l−1 to f, according to:

$\omega_{i(b[i]-1)}$=min{$\tau_{(i+1)0}$−(4$\lambda_i$+3$\mu_i$), Θ−2(n[i]+1)($\lambda_i$+$\mu_i$)};

$\omega_{ij}$=min{Θ−(4$\lambda_i$+3$\mu_i$+$\alpha_{i(j+1)}$), Θ$_0$−2(n[i]+1)($\lambda_i$+$\mu_i$)−$\sum_{m\in\Omega_l\backslash\{j\}}\omega_{im}$} for j∈$\Omega_{n[i]-1}\backslash\{b[i]-1, n[i]\}$;

$\omega_{i(n[i])}$=Θ−2(n[i]+1)($\lambda_i$+$\mu_i$)−$\sum_{m=0}^{n[i]-1}\omega_{im}$; and $\tau_{i0}$=Θ−$\varphi_{i0}$, where:

b[l] is an index denoting a step of putting the wafer in $C_l$ to a buffer module shared by $C_l$ and $C_{l+1}$;

$\theta_{ij}$=$\tau_{ij}$+4$\lambda_i$+3$\mu_i$+$\omega_{i(j-1)}$, i∈$N_K$ and j∈$N_{n[i]}$;

$\theta_{i0}$=$\tau_{i0}$+4$\lambda_i$+3$\mu_i$+$\omega_{i(n[i])}$, i∈$N_K$;

Θ is a cycle time of the multi-cluster tool;

$\alpha_{ij}$ is a time taken in processing the wafer at the j-th step in $C_i$;

$\tau_{ij}$ is a wafer sojourn time at the j-th step in $C_i$;

$\lambda_i$ is a time taken by $R_i$ to load or unload a wafer in $C_i$;

$\mu_i$ is a time taken by $R_i$ to move between process modules of $C_i$ for transiting from one processing step to another;

$N_L$={1, 2, . . . , L} for a positive integer L; and $\Omega_L$=$N_L\cup$\{0\}.

2. The method of claim 1, wherein the robots $R_i$, i=1, 2, . . . , K, are single-arm.

3. A method for controlling robots of a tree-like multi-cluster tool in wafer processing, the multi-cluster tool comprising K single-cluster tools denoted as $C_i$, i=1, 2, . . . , K, the single-cluster tool $C_i$ having a robot $R_i$ for wafer handling, the multi-cluster tool being decomposable into a plurality of cluster-tool-chains (CTCs) each having a serial topology, an individual CTC consisting of single-cluster tools $C_i$, $C_{i+1}$, . . . $C_{i'}$, being denoted as CTC[i, i'], processing steps performed by $C_i$ being indexed from 0 to n[i], a first processing step of $C_i$ having an index 0 and being a step of loading a wafer from a loadlock or a buffer module of $C_i$ to $R_i$, the method comprising:

determining values of $\omega_{ij}$, i=1, 2, . . . , K, and j=0, 1, . . . , n[i], wherein $\omega_{ij}$ is a robot waiting time for $R_i$ to wait at a j-th step in $C_i$ before unloading the wafer from a process module used for performing the j-th step in $C_i$;

for any i∈{1, 2, . . . , K} and any j∈{0, 1, . . . , n[i]}, when $R_i$ arrives at the process module for the j-th step for unloading the wafer therefrom in the j-th step performed in $C_i$, waiting, by $R_i$, for the robot waiting time of $\omega_{ij}$;

after the robot waiting time of $\omega_{ij}$ expires, unloading, by $R_i$, the wafer from the process module for the j-th step;

after the wafer is unloaded from the process module for the j-th step, transporting, by $R_i$, the wafer to the process module for a next step that is either a (j+1)th step, or a zeroth step when j=n[i]; and after the wafer arrives at the process module for the next step, loading, by $R_i$, the wafer to the second process module;

wherein the determining of $\omega_{ij}$, i=1, 2, . . . , K, and j=0, 1, . . . , n[i], comprises:

identifying an L-CTC set consisting of first individual CTCs each having a leaf tool therein, whereby one or more second individual CTCs not in the L-CTC set are also identified;

for each of the first individual CTCs, determining a minimum cycle time and then determining the values of $\omega_{ij}$ by performing a CTC-Check algorithm under a constraint that $\Theta$ is equal to the determined minimum cycle time;

for each second individual CTC, determining candidate values of $\omega_{ij}$ for each single-cluster tool therein by performing the CTC-Check algorithm under an initial constraint that $\Theta$ is equal to a maximum value of the minimum cycle times already determined for the first individual CTCs;

responsive to finding that the candidate $\omega_{ij}$ values for the second individual CTC are non-negative, setting the candidate $\omega_{ij}$ values as the determined values of $\omega_{ij}$ for the second individual CTC; and responsive to finding that at least one of the candidate $\omega_{ij}$ values for the second individual CTC is negative, performing:

determining a minimum cycle time for the second individual CTC; and determining the values of $\omega_{ij}$ for the second individual CTC as the candidate values of $\omega_{ij}$ obtained by performing the CTC-Check algorithm under a revised constraint that $\Theta$ is equal to the determined minimum cycle time for the second individual CTC;

wherein the CTC-Check algorithm for CTC[f, 1] is configured to compute the candidate values of $\omega_{ij}$ such that $\omega_{i(n[i])}$ is minimized for each value of i selected from $N_{[f, l-1]}$, and the CTC-Check algorithm comprises the steps of:

setting $\omega_{lj} = \min\{\Theta - (4\lambda_l + 3\mu_l + \alpha_{l(j+1)}),\ \Theta - 2(n[l]+1)(\lambda_l + \mu_l) - \Sigma_{m \in \Omega_j \setminus \{j\}} \omega_{lm}\},\ j \in \Omega_{n[l]-1}$;

setting $\omega_{l(n[l])} = \Theta - 2(n[l]+1)(\lambda_l + \mu_l) - \Sigma_{m=0}^{n[l]-1} \omega_{lm}$;

setting $\tau_{l0} = \Theta - \varphi_{l0}$; and setting values of $\omega_{ij}$'s, i=l-1 to f, according to:

$\omega_{i(b[i]-1)} = \min\{\tau_{(i+1)0} - (4\lambda_i + 3\mu_i),\ \Theta - 2(n[i]+1)(\lambda_i + \mu_i)\}$;

$\omega_{ij} = \min\{\Theta - (4\lambda_i + 3\mu_i + \alpha_{i(j+1)}),\ \Theta_0 - 2(n[i]+1)(\lambda_i + \mu_i) - \Sigma_{m \in \Omega_j \setminus \{j\}} \omega_{im}\}$ for $j \in \Omega_{n[i]-1} \setminus \{b[i]-1, n[i]\}$;

$\omega_{i(n[i])} = \Theta - 2(n[i]+1)(\lambda_i + \mu_i) - \Sigma_{m=0}^{n[i]-1} \omega_{im}$; and $\tau_{i0} = \Theta - \varphi_{i0}$, where:

b[l] is an index denoting a step of putting the wafer in $C_l$ to a buffer module shared by $C_l$ and $C_{l+1}$;

$\theta_{ij} = \tau_{ij} + 4\lambda_i + 3\mu_i + \omega_{i(j-1)}$, $i \in N_K$ and $j \in N_{n[i]}$;

$\theta_{i0} = \tau_{i0} + 4\lambda_i + 3\mu_i + \omega_{i(n[i])}$, $i \in N_K$;

$\Theta$ is a cycle time of the multi-cluster tool;

$\alpha_{ij}$ is a time taken in processing the wafer at the j-th step in $C_i$;

$\tau_{ij}$ is a wafer sojourn time at the j-th step in $C_i$;

$\lambda_i$ is a time taken by $R_i$ to load or unload a wafer in $C_i$;

$\mu_i$ is a time taken by $R_i$ to move between process modules of $C_i$ for transiting from one processing step to another;

$N_L = \{1, 2, \ldots, L\}$ for a positive integer L; and $\Omega_L = N_L \cup \{0\}$.

4. The method of claim 3, wherein the robots $R_i$, i=1, 2, . . . , K, are single-arm.

* * * * *